US009011015B2

(12) United States Patent
Ishikawa et al.

(10) Patent No.: US 9,011,015 B2
(45) Date of Patent: Apr. 21, 2015

(54) ROLLER BEARING UNIT

(75) Inventors: Hiroaki Ishikawa, Fujisawa (JP);
Tatsuo Wakabayashi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/822,610

(22) PCT Filed: Jun. 19, 2012

(86) PCT No.: PCT/JP2012/065631
§ 371 (c)(1),
(2), (4) Date: Mar. 12, 2013

(87) PCT Pub. No.: WO2012/176772
PCT Pub. Date: Dec. 27, 2012

(65) Prior Publication Data
US 2014/0233876 A1  Aug. 21, 2014

(30) Foreign Application Priority Data

Jun. 21, 2011 (JP) .................................. 2011-137722
Jan. 26, 2012 (JP) .................................. 2012-013980

(51) Int. Cl.
*F16C 33/62* (2006.01)
*F16C 33/76* (2006.01)
(Continued)

(52) U.S. Cl.
CPC ................ *F16C 33/62* (2013.01); *F16C 33/588* (2013.01); *F16C 2326/02* (2013.01);
(Continued)

(58) Field of Classification Search
CPC .... F16C 33/588; F16C 33/62; F16C 2326/02; F16C 33/7816; F16C 33/7853; F16C 19/185; F16C 33/7876; B60B 2380/73; B60B 2380/75; B60B 2900/111; B60B 2900/511

USPC ........... 384/477, 486, 492, 513, 537, 43, 544, 384/569, 589, 621, 622
See application file for complete search history.

(56) References Cited

U.S. PATENT DOCUMENTS 3,807,817 A * 4/1974 Black ............................ 384/543
3,937,535 A * 2/1976 Ladin ........................... 384/540
(Continued)

FOREIGN PATENT DOCUMENTS

GB       639643 A  *  7/1950   ............. F16C 23/06
GB       725214 A  *  3/1995   ............ F16C 13/006
(Continued)

OTHER PUBLICATIONS

International Search Report dated Sep. 25, 2012 w/ partial English translation (three (3) pages).
Japanese-language Written Opinion (PCT/ISA/237) dated Sep. 25, 2012 (three (3) pages).

*Primary Examiner* — Marcus Charles
(74) *Attorney, Agent, or Firm* — Crowell & Moring LLP

(57) ABSTRACT

A rolling bearing unit with decreased weight and improved durability is provided. An outer-ring core, manufactured using a ferrous alloy, forms an outer ring and is molded to an outer-ring main body that is manufactured using a synthetic resin containing reinforced fibers or using an aluminum alloy. Outer-ring raceway members are fitted into and fastened to mating concave surfaces of the inner circumferential surface of the outer-ring core that are exposed from the outer-ring main body. A hub core, manufactured using a ferrous alloy, forms a hub and is molded to a hub main body made using a synthetic resin containing reinforced fibers or using an aluminum alloy. Around the outer circumferential surface of the hub core, inner-ring raceway members are fitted onto and fastened to a fitting surface of the outer circumferential surface of the hub core that is exposed from the hub main body.

8 Claims, 9 Drawing Sheets

(51) Int. Cl.
*F16C 33/60* (2006.01)
*F16C 35/04* (2006.01)
*F16C 33/58* (2006.01)
*B60B 27/00* (2006.01)
*F16C 19/18* (2006.01)
*F16C 33/78* (2006.01)

(52) U.S. Cl.
CPC ............ *B60B 27/0005* (2013.01); *F16C 33/60* (2013.01); *B60B 2360/32* (2013.01); *B60B 2380/73* (2013.01); *B60B 2380/75* (2013.01); *B60B 2900/111* (2013.01); *B60B 2900/321* (2013.01); *F16C 19/185* (2013.01); *F16C 33/7876* (2013.01)

(56) References Cited

U.S. PATENT DOCUMENTS

| | | | |
|---|---|---|---|
| 4,113,328 A * | 9/1978 | Vander Meulen | 384/486 |
| 4,174,764 A * | 11/1979 | Mutschler et al. | 180/78 |
| 7,648,283 B2 * | 1/2010 | Komori | 384/513 |
| 8,029,195 B2 * | 10/2011 | Seo et al. | 384/544 |
| 2006/0171624 A1 * | 8/2006 | Niebling et al. | 384/544 |
| 2007/0098315 A1 | 5/2007 | Komori et al. | |
| 2010/0021099 A1 * | 1/2010 | Torii | 384/544 |

FOREIGN PATENT DOCUMENTS

| | | |
|---|---|---|
| JP | 2003-74570 A | 3/2003 |
| JP | 2005-180681 A | 7/2005 |
| JP | 2007-261305 A | 10/2007 |

\* cited by examiner

Prior Art

ROLLER BEARING UNIT

TECHNICAL FIELD

The present invention relates to a rolling bearing unit that is used in a wheel-support hub unit that supports the wheel of an automobile with respect to a suspension.

BACKGROUND ART

A wheel-support hub unit is used for supporting a wheel of an automobile so as to be able to rotate freely with respect to a suspension. The construction of a rolling bearing unit in which a rotating bearing ring is supported on the inner-diameter side or outer-diameter side of a stationary bearing ring is employed as the basic construction of a wheel-support hub unit. FIG. 11 illustrates the construction of a wheel-support hub unit that is disclosed in JP 2003-74570 (A). This wheel-support hub unit 1 has: an outer ring 2, which is the stationary bearing ring; a hub 3, which is the rotating bearing ring; and a plurality of rolling elements 4 for supporting the hub 3 so as to be able to freely rotate around the outer ring 2.

The outer ring 2 has an outer-ring main body 5 and pair of outer-ring raceway members 6. The outer-ring main body 5 is a cylindrical shape having a stationary-side flange 7 that protrudes outward in the radial direction and is formed around a portion of the outer circumferential surface of the outer-ring main body 5 near the inside end in the axial direction. Each of the outer-ring raceway members 6 has an outer-ring raceway 8 that is formed around the inner circumferential surface thereof, and is fastened on the inside of the outer-ring main body 5. The outer ring 2, having this kind of construction, is supported by and fastened to the suspension (not illustrated in the figure) by connecting the stationary-side flange 7 to a support member such as a knuckle, axle housing, axle beam or the like of the suspension so as not to be able to rotate with respect to the suspension during use. Here, the "inside" in the axial direction refers to the inside in the width direction of the automobile body when assembled in an automobile, and corresponds to the right side in each of the drawings. On the other hand, the "outside" in the axial direction refers to the outside in the width direction of the automobile, and is the left side in each of the drawings.

The hub 3 has a hub main body 9, and outside inner-ring raceway member 10, and an inside inner-ring raceway member 11. A rotating side flange 12 for supporting a wheel is formed around the outer circumferential surface of the hub main body 9 in a portion near the outside end that protrudes outward in the axial direction further than the outside end section in the axial direction of the outer ring 2. Moreover, a screw section is formed around the outer circumferential surface of the hub main body 9 on the inside in the axial direction. On the other hand, the outside inner-ring raceway member 10 has an outside inner-ring raceway 13 that is formed around part of the outer circumferential surface thereof, and is fixed onto the middle section in the axial direction of the hub main body 9. The inside inner-ring raceway member 11 has an inside inner-ring raceway 14 that is formed around the outer circumferential surface thereof, and a shoulder section 15 that is formed in a portion that is adjacent to the inside in the axial direction of the inside inner-ring raceway 14. The inside inner-ring raceway member 11, with the inner circumferential surface thereof fixed onto a portion of the outer circumferential surface of the hub main body 9 near the inside end in the axial direction, is fastened to the hub main body 9 by a nut 16 that is screwed around the screw section of the hub main body 9. The hub 3, having this kind of construction, rotates together with a wheel (not illustrated in the figure) that is supported by and fastened to the rotating-side flange 12 when in use.

The rolling elements 4 are arranged such that there is a plurality in each row between the outside inner-ring raceway 13 and the inside inner-ring raceway 14 and the outer-ring raceway 8, and are held in place by a retainer 17 so as to be able to roll freely.

The opening on the outside end in the axial direction of the rolling-element installation space 18 that exists between the inner circumferential surface of the outer ring 2 and the outer circumferential surface of the hub 3 is covered by a seal ring 19 that is mounted in this opening section. On the other hand, the opening on the inside end in the axial direction of the outer ring 2 is covered by a cover 21 that is mounted in this opening section. The seal ring 19 and the cover 21 prevent foreign matter such as dust or rainwater from entering into the rolling-element installation space 18, and prevent grease that is filled in the rolling-element installation space 18 from leakage to the outside.

Incidentally, in order to improve the operating performance of the automobile such as riding comfort and operating stability of the automobile, the unsprung weight of the automobile is reduced by making the suspension to which the outer ring is fastened and the wheel that is fastened to the hub using an aluminum alloy instead of a ferrous alloy such as carbon steel.

Furthermore, it is proposed that, together with reducing the weight of the wheel-support hub unit itself by using an aluminum alloy for the outer ring 2 and hub 3 material as well, the occurrence of galvanic corrosion in the portions where the suspension comes in contact with the wheel and wheel-support hub unit be prevented by combining this wheel-support hub unit with the aluminum alloy suspension and wheel. It is also possible to use a synthetic resin that contains reinforced fiber as a material of the wheel-support hub unit.

On the other hand, from the aspect of maintaining the durability of the wheel-support hub unit, there is a need to maintain high strength of the outer-ring raceways that are formed around the outer ring 2, and the inner-ring raceways that are formed around the hub 3. In order to accomplish this, together with manufacturing the outer-ring main body 5 and hub main body 9 using an aluminum alloy or synthetic resin that contains reinforced fibers, the outer-race raceway members 6, outside inner-race raceway member 10 and inside inner-raceway member 11 around which the raceway surfaces are formed are manufactured using a ferrous alloy such as carbon steel or bearing steel. As a result, together with being able to reduce the weight of the wheel-support hub unit, it is possible to maintain the strength of the inner-ring raceways and outer-ring raceways, and to improve the durability of the overall wheel-support hub unit.

However, the temperature of the outer ring 2 and the hub 3 increases during use. Therefore, due to differences in the linear expansion coefficients between the outer-ring raceway member 6 and outer-ring main body 5, or between the outside inner-ring raceway member 10 and inside inner-ring raceway member 11 and the hub main body 9, which are made of different materials, there is a possibility that preloading that is applied to the rolling elements 4 may change, or gaps may occur in the areas of fit between these members.

In the case where such gap occurs, in the construction of FIG. 11, the boundary 24 between the hub main body 9 and the outside inner-ring raceway member 10 is located further on the outer space side than the seal ring 19, so the boundary 24 where the gap occurs becomes a pathway for rainwater or dirty water to enter. When water enters in between the hub main body 9 and the outside inner-ring raceway member 10 that are made of different metals, galvanic corrosion occurs in the hub main body 9 made of aluminum alloy, the electric potential of which is lower than ferrous alloy. The contents of JP 2003-74570 (A) are incorporated into this specification by reference.

RELATED LITERATURE

Patent Literature

[Patent Literature 1] JP 2003-74570 (A)

SUMMARY OF THE INVENTION

Problem to be Solved by the Invention

The object of the present invention is to achieve construction of a rolling bearing unit that is capable of both weight reduction and improved durability.

Means for Solving the Problems

The rolling-bearing unit of the present invention comprises:

a stationary bearing ring that is supported by and fastened to a support member that does not rotate during use;

a rotating bearing ring that is concentrically arranged with the stationary bearing ring;

stationary-side raceway surfaces and rotating-side raceway surfaces that are formed around circumferential surfaces of the stationary bearing ring and rotating bearing ring that face each other;

a plurality of rolling elements that are located between the stationary-side raceway surfaces and rotating-side raceway surfaces so as to be able to roll freely; and a seal member that blocks the rolling-element installation space where the rolling elements are located from the external space.

Particularly, in the rolling bearing unit of the present invention, the rotating bearing ring comprises:

a rotating-side main body that has a cylindrical member that is made using a synthetic resin containing reinforced fibers, or an aluminum alloy;

a rotating-side core that has a cylindrical member that is made using a ferrous alloy, part thereof being molded to the rotating-side main body, and a portion on the stationary bearing ring side of the circumferential surface thereof being exposed from the rotating-side main body; and a rotating-side raceway member that has a cylindrical member that is made using a ferrous alloy, having rotating-side raceway surfaces formed around the circumferential surface on the stationary bearing ring side thereof, and that is fitted with and fastened to the portion on the stationary bearing ring side of the circumferential surface of the rotating-side core that is exposed from the rotating-side main body; and the stationary bearing ring comprises:

a stationary-side main body that has a cylindrical member that is made using a synthetic resin containing reinforced fibers, or an aluminum alloy;

a stationary-side core that has a cylindrical member that is made using a ferrous alloy, part thereof being molded to the stationary-side main body, and a portion on the rotating bearing ring side of the circumferential surface thereof being exposed from the stationary-side main body; and a stationary-side raceway member that has a cylindrical member that is made using a ferrous alloy, having stationary-side raceway surfaces formed around the circumferential surface on the rotating bearing ring side thereof, and that is fitted with and fastened to the portion on the rotating bearing ring side of the circumferential surface of the stationary-side core that is exposed from the stationary-side main body.

In the rolling bearing unit of the present invention, preferably the boundary section between the rotating-side main body and the rotating-side core, and the boundary section between the stationary-side main body and the stationary-side core are located inside a space that is blocked from the external space by the seal member.

The present invention is particularly and preferably applied to a wheel-support hub unit for supporting a wheel of an automobile with respect to a suspension, which is a non-rotating support member, so as to be able to rotate freely. In this case, the stationary bearing ring is an outer ring that is supported by and fastened to the suspension during use, and the rotating bearing ring is a hub that rotates with the wheel while supporting this wheel during use. Moreover, the stationary-side raceway surfaces are double-row outer-ring raceway surfaces that are formed around the inner circumferential surface of the outer ring, and the rotating-side raceway surfaces are double-row inner-ring raceway surfaces that are formed around the outer circumferential surface of the hub.

Particularly, in a form of a wheel-support hub unit to which the present invention is applied, a rotating-side flange that protrudes outward in the radial direction and is for supporting the wheel is formed around a portion of the outer circumferential surface of the rotating-side cylindrical section of the rotating-side main body that protrudes further outward in the axial direction than the outside end section in the axial direction of the outer ring, a rotating-side core flange that protrudes outward in the radial direction is formed around the outside end in the axial direction of the rotating-side core, and this rotating-side core flange is molded to (embedded in) the rotating-side flange.

In this form of wheel-support hub unit, through holes that pass in the axial direction through a plurality of locations in the circumferential direction of the rotating-side flange are formed for fastening a plurality of studs that have a serration section formed around part in the axial direction thereof. In this invention, preferably the rotating-side core flange is as long as possible in the radial direction of the rotating-side flange. In this case, it is possible to prevent interference between the rotating-side core flange and the studs that are passed through the through holes by forming notches that extend from the outside end to the middle section in the radial direction of the rotating-side core flange.

Alternatively, serration holes that pass in the axial direction through a plurality of locations in the circumferential direction of the rotating-side core flange are formed at positions that are aligned with the through holes; the inner circumferential surfaces of the serration holes are exposed from the inner circumferential surface of the through holes; and with the serration sections of the studs directly fitted with the serration holes, a pair of seal rings can be placed between the outer circumferential surfaces of the studs and portions of the inner circumferential surface of the through holes between which the serration holes are sandwiched in the axial direction.

Furthermore, additionally or alternatively, a plurality of nuts for fastening a plurality of bolts can be molded in a plurality of locations in the circumferential direction of the rotating-side flange.

Particularly, in another form of a wheel-support hub unit to which the present invention is applied, a stationary-side flange that protrudes outward in the radial direction and that is supported by the suspension is formed around the outer circumferential surface of the stationary-side cylindrical section of the stationary-side main body; a stationary-side core flange that protrudes outward in the radial direction is formed around the outer circumferential surface of the stationary-side core; and this stationary-side core flange is molded to (embedded in) the stationary-side flange.

In this form of wheel-support hub unit, through holes that pass in the axial direction through a plurality of locations in the circumferential direction of the stationary-side flange are formed for fastening a plurality of studs or bolts having serration sections on part in the axial direction thereof. In the present invention, preferably the stationary-side core flange is made as long as possible in the radial direction of the stationary-side flange. In this case, it is possible to prevent interference between the stationary-side core flange and the studs or bolts that are passed through the through holes by forming notches that extend from the outside end to the middle section in the radial direction of the stationary-side core flange.

Alternatively, serration holes that pass in the axial direction through a plurality of locations in the circumferential direction of the stationary-side core flange at positions that are aligned with the through holes; the inner circumferential surfaces of the serration holes are exposed from the inner circumferential surfaces of the through holes; and with the serration sections of the studs directly fitted with the serration holes, a pair of seal rings can be placed between the outer circumferential surfaces of the studs and portions of the inner circumferential surfaces of the through holes between which the serration holes are sandwiched in the axial direction.

Furthermore, additionally or alternatively, a plurality of nuts for fastening a plurality of bolts can be molded in a plurality of locations in the circumferential direction of the stationary-side flange.

Effect of the Invention

According to the present invention, it is possible to achieve construction of a rolling bearing unit having reduced weight and improved durability. In other words, in the present invention, the rotating-side main body of the rotating bearing ring and the stationary-side main body of the stationary bearing ring are made using a synthetic resin containing reinforced fibers or using an aluminum alloy. Therefore, it is possible to reduce the weight of the rotating bearing ring and stationary bearing ring.

Moreover, by making the rotating-side raceway members and stationary-side raceway members, which require high strength, using a ferrous alloy, it is possible to improve the durability of the rotating-side raceway and stationary-side raceway. Furthermore, the rotating-side raceway members and stationary-side raceway members are directly fitted around and fastened to the rotating-side core and stationary-side core that are made using a ferrous alloy. Therefore, it is possible to make the linear expansion coefficient nearly the same for the rotating-side raceway members and stationary-side raceway members, and the rotating-side core and stationary-side core that support these raceway members. As a result, it is possible to prevent changes in pre-loading that is applied to rolling elements, and the occurrence of paths through which foreign matter such as water enters into the areas of contact between the rotating-side raceway members and rotating-side core, and into the areas of contact between the stationary-side raceway members and the stationary-side core, which is caused by differences in the linear expansion coefficient of the rotating-side raceway members and stationary-side raceway members, and the rotating-side core and stationary-side core. Furthermore, occurrence of galvanic corrosion in these areas of contact is also prevented. As a result, it is possible to improve the durability of the rotating-side raceway members and stationary-side raceway members, and the rotating-side core and stationary-side core, and thus it is possible to improve the durability of the rolling bearing unit.

Moreover, the boundary section between the rotating-side main body and the rotating-side core, and the boundary section between the stationary-side main body and the stationary core are located inside spaces that are blocked from external space by seal members (seal ring, cap member and the like). Therefore, even when gaps occur in these boundary sections due to differences in the linear expansion coefficient of these members, foreign matter such as water is prevent from entering in from the external space through the gaps.

When the present invention is applied to a wheel-support hub unit, a rotating-side core flange that protrudes outward in the radial direction is provided on the outside end in the axial direction of the rotating-side core of the hub, and is molded into a rotating-side flange that protrudes outward in the radial direction from the outer circumferential surface of the rotating main body for supporting a wheel. Therefore, even when material having relatively low strength is used in the rotating-side main body that includes the rotating-side flange, it is possible to reinforce the rigidity of the rotating-side flange by the rotating-side core flange that is made using a ferrous alloy having high strength.

Furthermore, in the case of applying the present invention to wheel-support hub unit, by forming serration holes in the rotating-side core flange that directly fits with serration sections on the studs, and by fastening the studs by way of a serration fit, it is possible to stably fasten the studs to the rotating-side flange.

On the other hand, when the present invention is applied to a wheel-support hub unit, a stationary-side flange that protrudes outward in the radial direction is provided around the outer circumferential surface of the stationary-side core of the outer ring, and is molded into a stationary-side flange that protrudes outward in the radial direction from the outer circumferential surface of the stationary-side main body, and that is supported by the suspension. Therefore, even when a material having a relatively low strength is used for the stationary-side main body that includes the stationary-side flange, it is possible to reinforce the rigidity of the stationary-side flange by the stationary-side core flange that is made using a ferrous alloy having high strength.

In this case as well, by forming serration holes in the stationary-side core flange that directly fits with serration sections on the studs, and by fastening the studs by way of a serration fit, it is possible to stably fasten the studs to the stationary-side flange.

MODES FOR CARRYING OUT THE INVENTION

In the following, examples of wheel-support hub units of a few embodiments will be explained for the rolling bearing unit of the present invention. A characteristic of the rolling bearing unit of the present invention is devising construction of the stationary bearing ring and/or rotating bearing ring while using material for the components that makes it possible to reduce the weight in order to accomplish both weight reduction and improvement of durability.

FIRST EXAMPLE

Figure 11:
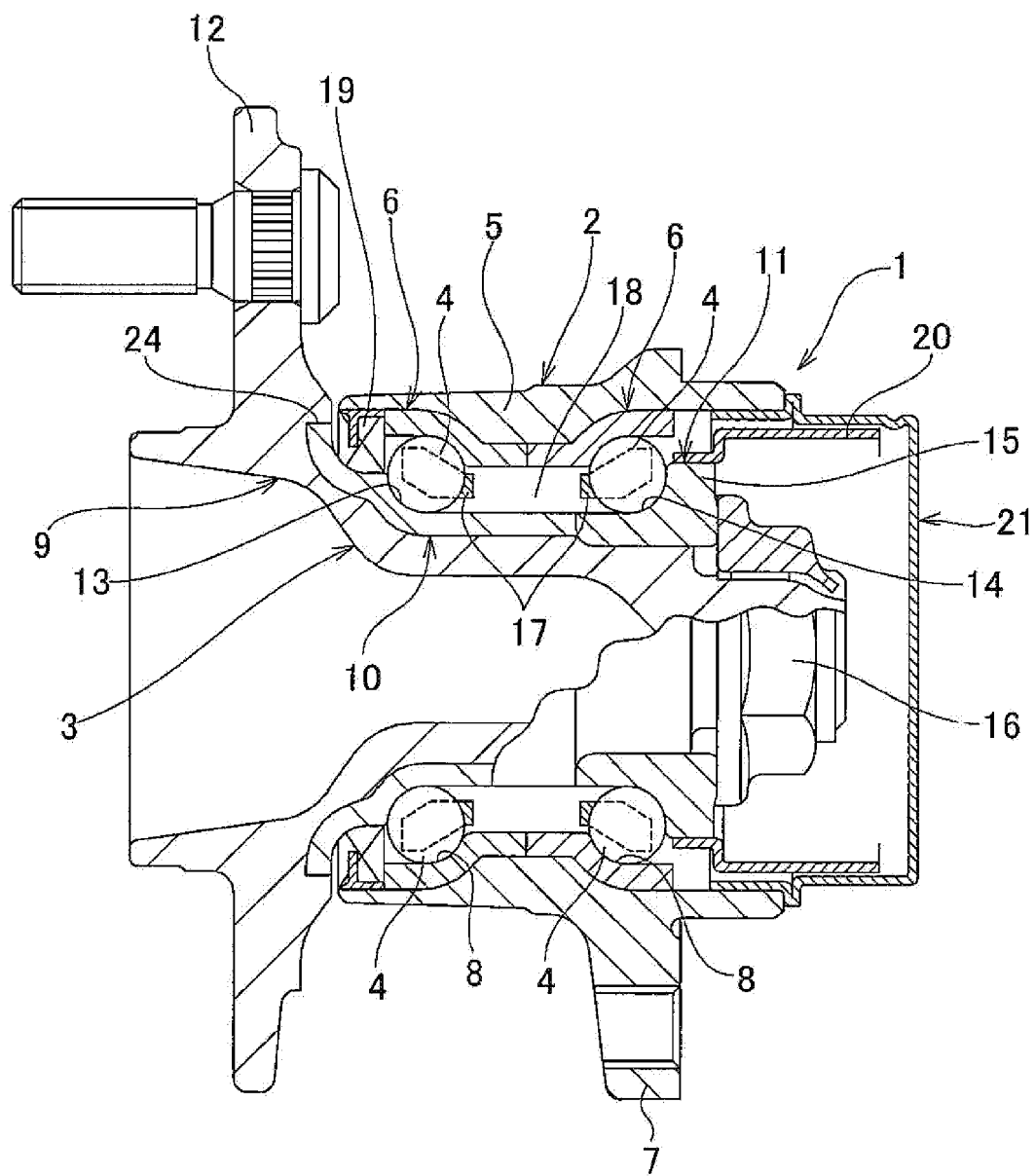
FIG. 11 is a cross-sectional drawing illustrating the construction of a conventional wheel-support hub unit.

FIG. 1 to FIG. 6 illustrate a first example of an embodiment of the present invention. The wheel-support hub unit 1a of this example is for an undriven wheel, and has the same basic construction as the conventional construction illustrated in FIG. 11. The wheel-support hub unit 1a has an outer ring 2a, which is a stationary bearing ring, a hub 3a, which is located on the inner-diameter side of the outer ring 2a and that is a rotating bearing ring, and a plurality of rolling elements 4 for supporting the hub 3a so as to be able to rotate freely with respect to the outer ring 2a. The rolling elements 4 are arranged between double-row outer-ring raceways 33 that are formed around the outer ring 2a and double-row inner-ring raceways 54 that are formed around the hub 3a, and are held in each row by retainers 35 so as to be able to roll freely.

In this example, the outer ring 2a has an outer-ring main body 25, which is a stationary-side body, an outer-ring core 26, which is a stationary-side core, and outer-ring raceway members 27, which are stationary bearing ring members. The outer-ring main body 25 is made using an aluminum alloy, or a synthetic resin that contains reinforced fibers, and is a cylindrical member that is formed into a cylindrical shape. Moreover, a stationary-side flange 28 is formed around the outer circumferential surface of the outer-ring main body 25 in the middle section in the axial direction, and protrudes outward in the radial direction from the outer circumferential surface. Through holes 91, 98 (see FIG. 8 and FIG. 9), which pass through in the axial direction, are formed at a plurality of locations in the circumferential direction around the stationary-side flange 28, and bolts (not illustrated in the figure) or studs 97 (see FIG. 9) for fastening to the outer ring 2a to a non-rotating support member (not illustrated in the figure) of the suspension such as a knuckle are inserted through these through holes 91, 98. Furthermore, an inward facing projection 29 is formed around the inner circumferential surface of the outer-ring main body 25 in the middle section in the axial direction, and protrudes inward in the radial direction from the inner circumferential surface.

Figure 1:
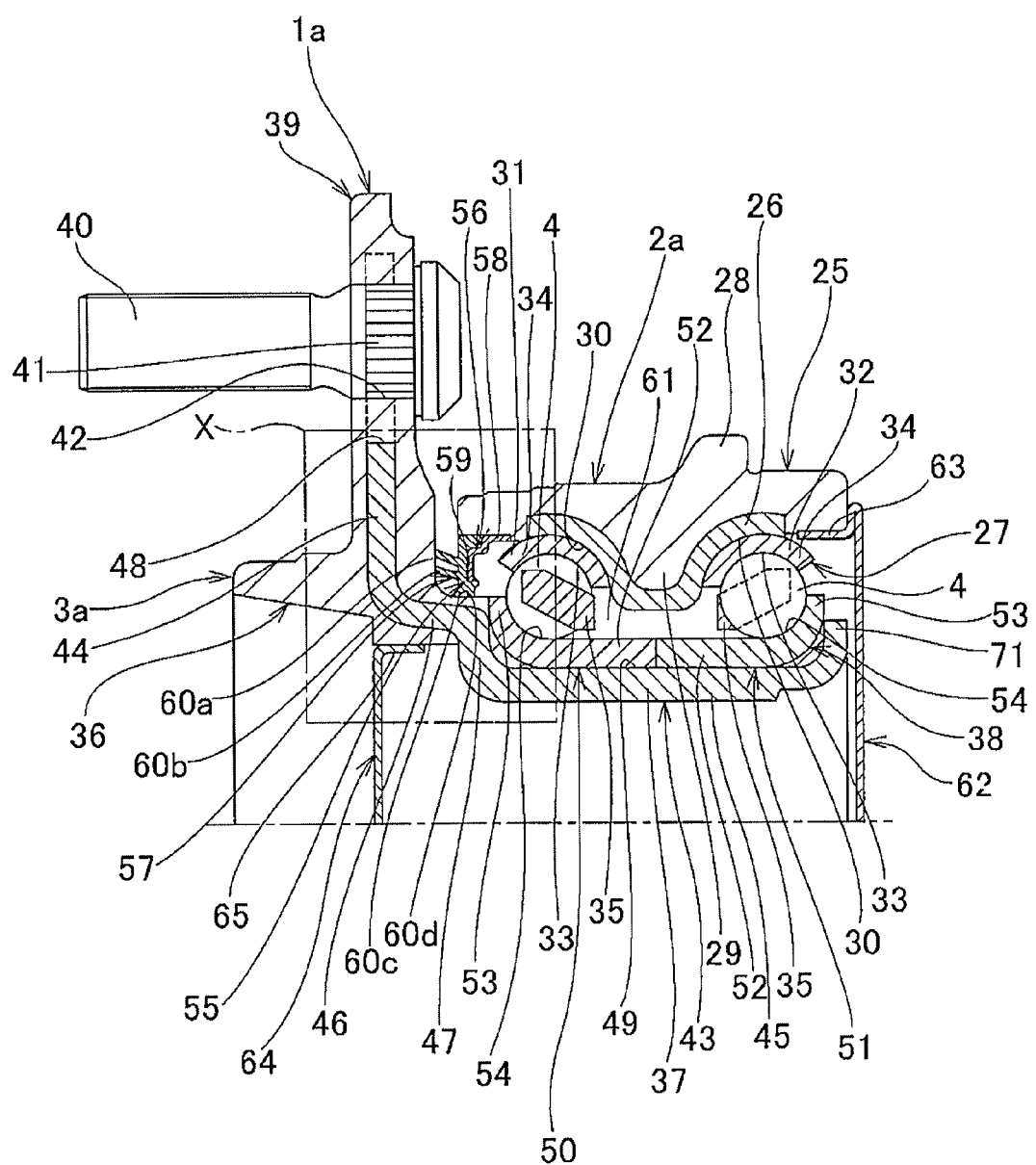
FIG. 1 is a cross-sectional drawing illustrating the construction of a wheel-support hub unit of a first example of an embodiment of the present invention.

The outer-ring core 26 is made of a ferrous alloy such as various kinds of carbon steel, and is a cylindrical member that is formed into a cylindrical shape. Hardening treatment, such as heat treatment, is not performed on the outer-ring core 26. The middle section in the axial direction of the outer-ring core 26 has a smaller diameter than both end sections in the axial direction. In other words, the cross-sectional shape of the outer-ring core 26 when cut along a virtual plane that includes the center axis of the outer-ring core 26 is V-shaped as illustrated in FIG. 1. Therefore, with the outer-ring core 26 molded to the outer-ring main body 25, the cross-sectional shape of the outer-ring main body 25 and the outer-ring core 26 is near to being the cross-sectional shape required for the outer ring 2a. Moreover, with such a shape as this, when molding the outer-ring core 26 to the outer-ring main body 25, rigidity against compressive stress inward in the radial direction that is applied to the outer-ring core 26 due to contraction or temperature drop of the outer-ring main body 25 is maintained.

With the middle section in the axial direction of the outer-ring core 26 fitted with the inward facing projection 29 of the outer-ring main body 25, the outer-ring core 26 is molded to (embedded in) the outer-ring main body 25. By fitting the middle section in the axial direction of the outer-ring core 26 with the inward facing projection 29 of the outer-ring main body 25, the strength of the middle section in the axial direction of the outer-ring core 26 is prevented from dropping. The outer-ring core 26 can be obtained by a processing method such as machining, pressing, forging and the like.

Moreover, with the outer-ring core 26 molded to the outer-ring main body 25, the inner circumferential surface of the outer-ring core 26 is exposed from the main-ring body 25. Then, a pair of mating concave surfaces 30 are formed in order to fasten the outside outer-ring raceway member 31 and the inside outer-ring raceway member 32 of the outer-ring raceway members 27 inside the inner circumferential surface from the middle section in the axial direction to the sections near both ends in the axial direction. The inner diameter of these mating concave surfaces 30 in the free state is a little less than the outer diameter of the outer-ring raceway members 27 that fit with the mating concave surfaces 30 when the outer-ring raceway members 27 are fastened inside. As a result, together with being able to maintain sufficient fitting strength between outer-ring core 26 and the outer-ring raceway members 27, it is possible to improve the rolling fatigue life by placing the outer-ring raceway members 27 under compressive stress.

In the assembled state illustrated in FIG. 1, the boundary between the outer-ring main body 25 and the outer-ring core 26 exists inside a space that is blocked from the external space by the seal ring 55, inside cap member 62 and outside cap member 64.

The outer-ring raceway members 27 are made of a ferrous alloy such as various kinds of carbon steel and the like, and are composed of an outside outer-ring raceway member 31 and an inside outer-ring raceway member 32. The outside outer-ring raceway member 31 is such that the outer circumferential surface thereof is a convex arc shaped cylindrical shape. Moreover, an outer-ring raceway 33, which is a stationary-side raceway, is formed around the inner circumferential surface of the outside outer-ring member 31. The outside outer-ring raceway member 31 is such that the inner diameter of the outside end in the axial direction is greater than the inner diameter of the inside end in the axial direction, and forms a counter bore 34.

On the other hand, the inside outer-ring raceway member 32 has a symmetrical shape in the axial direction with the outside outer-ring raceway member 31. In other words, the inside outer-ring raceway member 32 is such that an outer-ring raceway 33 is formed around the inner circumferential surface thereof, and the inner diameter of the inside end in the axial direction is greater than the inner diameter of the outside end in the axial direction, to form a counter bore 34. The outside outer-ring raceway member 31 and the inside outer-ring raceway member 32 can be obtained by a processing method such as machining, pressing, forging and the like.

The outside outer-ring raceway member 31 and inside outer-ring raceway member 32 are fastened inside the pair of mating concave surfaces 30 of the outer-ring core 26. Serration is formed around the outer circumferential surface of the outside outer-ring raceway member 31 and the inside outer-ring raceway member 32, and the mating concave surfaces 30, and by performing a serration fit between these surfaces, it is possible to prevent relative rotation in the circumferential direction between the outside outer-ring raceway member 31 and the inside outer-ring raceway member 32 and the outer-ring core 26. Moreover, with the outside outer-ring raceway member 31 and the inside outer-ring raceway member 32 fastened inside the mating concave surfaces 30, and with the rolling elements 4 held in the retainers 35, the inner diameter of the counter bore 34 of the outside outer-ring raceway member 31 and the inside outer-ring raceway member 32 is a little smaller than the diameter of the circumscribed circle when the rolling elements 4 are located on the most inner diameter side of the retainers 35, and more specifically is smaller by only 0.1 mm to 1 mm. With construction such as this, with the rolling elements 4 that are held in the retainers 35 assembled in the outside outer-ring raceway member 31 and inside outer-ring raceway member 32, the rolling elements 4 are prevented from coming out from the counter bore 34 side.

On the other hand, the hub 3a has a hub main body 36, which as a rotating-side body, a hub core 37, which is a rotating-side core, and an inner-ring raceway members 38, which are rotating side raceway members. The hub main body 36 is made using a synthetic resin containing reinforced fibers, or an aluminum alloy, and is a cylindrical shaped member that is formed into a cylindrical shape. Moreover, a rotating-side flange 39 for supporting a wheel is formed around the outer circumferential surface of the hub main body 39 in a portion that protrudes further outward in the axial direction than the outside end section in the axial direction of the outer ring 2a and protrudes outward in the radial direction from the outer circumferential surface. Furthermore, through holes 42 for fastening a serrated section 41 that is formed on the portions near the base ends of studs 40 with an interference fit are formed at a plurality of locations in the circumferential direction of the rotating-side flange 39. When the hub main body 36 is made using an aluminum alloy, the material of the studs 40 is preferably an aluminum alloy or a titanium alloy for which galvanic corrosion does not occur when in contact with an aluminum alloy. On the other hand, when the hub main body 36 is made using a synthetic resin containing reinforced resin, it is possible to use studs 40 that are made using a ferrous alloy.

Moreover, the portion of the outer circumferential surface of the hub main body 36 near the rotating-side flange 39, and the portion near the base end of the inside surface in the axial direction of the rotating-side flange 39 are surfaces that come in sliding contact with the seal ring 55. Therefore, when the hub main body 36 is made of an aluminum alloy, an anodic oxide film that has a film thickness of about 30 to 60 µm is formed in the portion that is a sliding surface by performing alumite treatment. Generally, in alumite treatment, the film thickness of the anodic oxide film is 5 to 20 µm, however, in this example, by making the film thickness comparatively thick, it is possible to improve the resistance to abrasion of this portion. However, the upper limit of the film thickness is set thick enough so that the effect of an increase in volume due to chemical change of the surface does not have an effect on the fastened state of the outside cap member 64 that is fastened inside the inner-diameter side of the hub main body 36.

Figure 2:
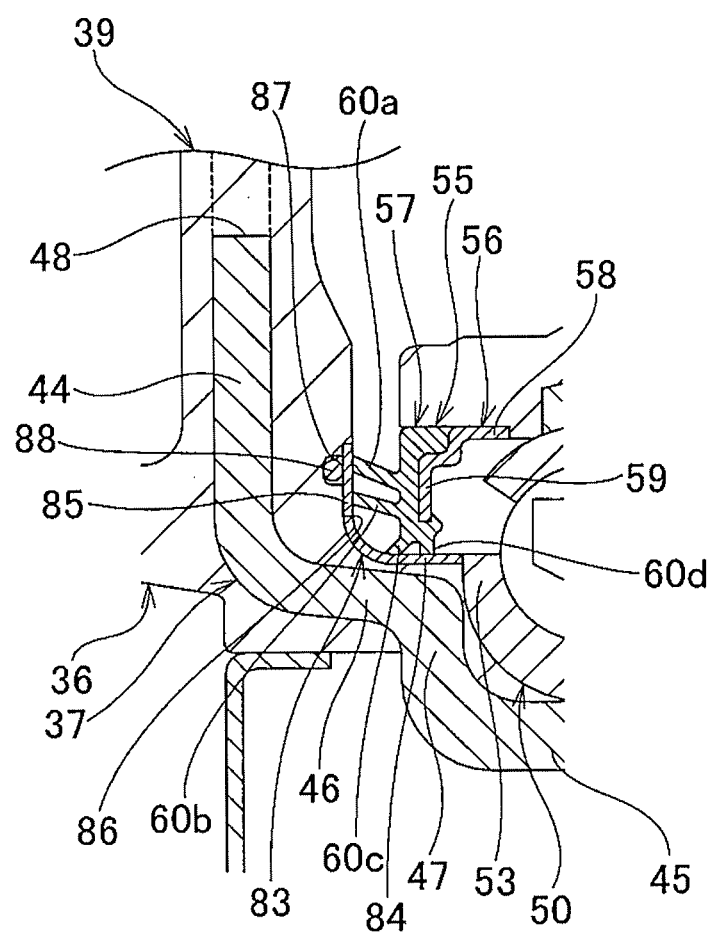
FIG. 2 is an enlarged view for explaining, a different example of construction of the portion near the base end of the rotating-side flange, which is a sliding surface with the seal ring, and corresponds to part X in FIG. 1.

On the other hand, when the hub main body 36 is made using a synthetic resin containing reinforced fiber, as illustrated in FIG. 2, it is possible to form a sliding ring 83 in the portion that is to be the sliding surface. The sliding ring 83 is made by pressing stainless steel material, and has cylindrical section 84, and a flange section 85 that is bent outward in the radial direction from the outside edge in the axial direction of the cylindrical section 84. The sliding ring 83 is fastened around the outside of the outer circumferential surface of the hub main body 36 in the portion near the rotating-side flange 39. Moreover, the inside end in the axial direction of the cylindrical section 84 comes in contact with the outside surface in the axial direction of the shoulder section 53 of the outside inner-ring raceway member 50. A bearing surface 86 is formed around the entire circumference of the inside surface in the axial direction of the rotating-side flange 39 in the portion near the base end, being depressed from the inside surface in the axial direction about the thickness of the flange section 85, and the outside surface in the axial direction of the flange section 85 is allowed to come in contact with this bearing surface 86. Furthermore, a fastening groove 87 is formed around the entire circumference of the bearing surface 86 in the portion near the outside end in the radial direction, and an O-ring 88 is fastened between the outside surface in the axial direction of the flange section 85 in the portion near the outside end in the radial direction and the bottom surface of the fastening groove 87. With construction such as this, foreign matter such as water is prevented from entering between the outside surface in the axial direction of the flange section 85 and the bearing surface 86.

The hub core 37 is made using a ferrous alloy such as various kinds of carbon steel and the like, and is a cylindrical member that is formed in a cylindrical shape. The hub core 37 has a cylindrical section 43 and a hub core flange 44. When alumite treatment is performed on the sliding surface of the hub main body 36 that comes in sliding contact with the seal ring 55, a drop in the strength of the hub core 37 made of a ferrous alloy that is caused by hydrogen embrittlement due to this alumite treatment is prevented, so hardening treatment, such as heat treatment, is not performed on the hub core 37. However, when alumite treatment is not performed, heat treatment in order to harden the hub core 37 may be performed.

The cylindrical section 43 is constructed such that a small-diameter cylindrical section 45 on the inside in the axial direction, a stepped section 47 and a large-diameter cylindrical section 46 on the outside in the axial direction are continuous. By making the cylindrical section 43 a stepped cylindrical shape, when molding the hub core 37 to the hub main body 36, the outside surface in the axial direction of the stepped section 47 is used to prevent the material of the hub main body 36 from flowing into the inner-diameter side of the small-diameter cylindrical section 45. As a result, it is possible to improve productivity by conserving material. It is also possible for the material of the hub main body 36 to flow into the inner-diameter side of the small-diameter cylindrical section 45, and to make the inner-diameter side solid. However, in this case, there is a possibility that a gap will occur between the inner circumferential surface of the small-diameter cylindrical section 45 and the hub main body 36 due to contraction of the material during formation. When the gap occur between the inner circumferential surface of the small-diameter cylindrical section 45 and the hub main body 36, even though the inner-diameter side of the cylindrical section 43 is solid, there is hardly any difference in strength with the case when the cylindrical section 43 is hollow.

Moreover, a hub core flange 44 is formed around the outside end in the axial direction of the outer circumferential surface of the large-diameter cylindrical section 46 so as to protrude outward in the radial direction from the outer circumferential surface. Notches 48 are formed from the outside end toward the middle section in the radial direction of the hub core flange 44. With construction such as this, with the hub core 37 molded to the hub main body 36, interference between the hub core flange 44 and the studs 40 that are fastened in the through holes 42 in the rotating-side flange 39 is prevented. Instead of notches 48, it is possible to form through hole on the core side at locations that are aligned with the through holes 42 of the rotating-side flange 39, with the core-side through holes having an inner diameter that is larger than the inner diameter of the through holes 42. In either case, even when the material of the hub core flange 44 of the hub core 37 and the material of the studs have a relationship in which galvanic corrosion occurs, contact between the hub core flange 44 and studs 40 is prevented.

With the hub core flange 44 aligned with the rotating-side flange 39 of the hub main body 36, the hub core 37 is molded (embedded) to the hub main body 36. Moreover, with the hub core 37 molded to the hub main body 36, a fitting surface 49 for fastening the outside inner-ring raceway member 50 and inside inner-ring raceway member 51 of the inner-ring raceway members 38 is formed in the portion of the outer circumferential surface of the cylindrical section 43 of the hub core 37 that is exposed from the hub main body 36. In the assembled state illustrated in FIG. 1, the boundary between the hub core 37 and the hub main body 36 exists in the space that is blocked from the external space by the seal ring 55, inside cap member 62, and outside-cap member 64.

The inner-ring raceway members 38 are made of a ferrous alloy such as various carbon steel, and each of them is a cylindrical member that is formed into a cylindrical shape. The inner-ring raceway members 38 are comprised of an outside inner-ring raceway member 50 and inside inner-ring raceway member 51. The outside inner-ring raceway member 50 has a cylindrical section 52 and a shoulder section 53 that is bent outward in the radial direction from the outside end section in the axial direction of the cylindrical section 52. Moreover, an inner-ring raceway 54, which is a rotating-side raceway, is formed around the outer circumferential surface of the cylindrical section 52 from the portion near the outside end in the axial direction to the inside surface in the axial direction of the shoulder section 53.

On the other hand, the inside inner-ring raceway member 51 has a symmetrical shape in the axial direction with the outside inner-ring raceway member 50. In other words, the inside inner-ring raceway member 51 has a cylindrical section 52, and a shoulder section 53 that is bent outward in the radial direction from the inside end section in the axial direction of the cylindrical section 52. Moreover, an inner-ring raceway 54, which is a rotating-side raceway, is formed around the outer circumferential surface of the cylindrical section 52 from the portion near the inside end in the axial direction to the outside surface in the axial direction of the shoulder section 53.

The outside inner-ring raceway member 50 and the inside inner-ring raceway member 51 are fastened around the outside of the fitting surface 49 of the hub core 37. Serration is formed around the inner circumferential surfaces of the outside inner-ring raceway member 50 and the inside inner-ring raceway member 51 and around the fitting surface 49, and by fitting together the serrations of these surfaces, the outside inner-ring raceway member 50 and the inside inner-ring raceway member 51 and the hub core 37 are surely prevented from rotating in the circumferential direction with respect to each other.

The seal ring 55 is located between the inner circumferential surface of the outside end in the axial direction of the outer-ring main body 25 of the outer ring 2a and the outer circumferential surface of the hub main body 36 of the hub 3a and the inside surface in the axial direction of the rotating-side flange 39 of the hub main body 36. The seal ring 55 comprises a metal insert 56 and a seal member 57. The metal insert 56 is made of a ferrous alloy, and has a cylindrical fitting section 58, and a circular ring section 59 that is bent inward in the radial direction from the outside end in the axial direction of the cylindrical fitting section 58. The seal member 57 is made of an elastic material such as rubber or other elastomer, and is connected and fastened to the metal insert 56 by cured adhesion or the like. The seal member 57 has a plurality of seal lips 60a, 60b, 60c and 60d.

Moreover, the seal ring 55 is assembled in the outer ring main body 25 by fastening the cylindrical fitting section 58 of the metal insert 56 inside the outside end section in the axial direction of the outer-ring main body 25. In the assembled state, the tip end edges of the seal lips 60a, 60b, 60c and 60d come in sliding contact around the entire circumference of the outer circumferential surface of the hub main body 36, or inside surface in the axial direction of the rotating-side flange 39. As a result, the outside end side in the axial direction of the space 61 where the rolling elements 4 are installed is blocked from the external space. The inside end section in the axial direction of the metal insert 56 and the outside end section in the axial direction of the outside outer-ring raceway member 31 overlap in the radial direction. In this way, the dimension in the axial direction of the wheel-support rolling bearing 1a is not increased.

When the outer-ring main body 25 is made using an aluminum alloy, rubber, a gasket or an adhesive is placed between the outer-ring main body 25 and the metal insert 56. As a result, the occurrence of galvanic corrosion due to foreign matter such as water entering between the outer-ring main body 25 and the metal insert 56 is prevented. Alternatively, it is also possible to prevent the occurrence of galvanic corrosion by using a material in which galvanic corrosion does not occur between the material and the aluminum alloy material of the outer-ring main body 25 as the material of the metal insert 56.

An inside cap member 62 is provided on the inside end section in the axial direction of the outer-ring main body 25. The inside cap member 62 is cylindrical shaped with a bottom section and is such that the outside end in the radial direction of the bottom section is bent toward the inside in the radial direction, and is further bent toward the outside in the axial direction (left side in FIG. 1), and the cylindrical section 63 of the inside cap member 62 that extends toward the outside in the radial direction is fastened inside the inside end in the axial direction of the inner circumferential surface of the outer-ring main body 25. As a result, the inside end side in the axial direction of the rolling-element installation space 61 is blocked from the external space. When the outer-ring main body is made using an aluminum alloy, preferably the inside cap member 62 will be made using an aluminum alloy, or a material in which galvanic corrosion does not occur between the material and an aluminum alloy. As a result, the occurrence of galvanic corrosion between the mating surfaces of the outer-ring main body 25 and the inside cap member 62 is prevented. In the assembled state illustrated in FIG. 1, the outside end in the axial direction of the cylindrical section 63 of the inside cap member 62, and the inside end section in the axial direction of the inside outer-ring raceway member 32 overlap in the radial direction. In this way, the dimension in the axial direction of the wheel-support hub unit 1a is not increased.

An outside cap member 64 is provided on the inner-diameter side near the outside end in the axial direction of the hub main body 36 of the hub 3a. The outside cap member 64 has a cylindrical shape with a bottom, and is such that the cylindrical section 65 of the outside cap member 64 that extends toward the inside in the axial direction from the outside end in the radial direction is fastened on the inside of the inner circumferential surface of the hub main body 36 in the portion near the outside end in the axial direction. As a result, foreign matter such as water is prevented from entering into the inner diameter side of the hub 3a from the external space. When the hub main body 36 is made using an aluminum alloy, preferably the outside cap member 64 will be made using an aluminum alloy, or a material in which galvanic corrosion does not occur between the material and an aluminum alloy. As a result, the occurrence of galvanic corrosion between the mating surfaces of the hub main body 36 and the outside cap member 64 is prevented.

In the following, the procedure for assembling the wheel-support hub unit 1a of this example will be explained. First, with the outer-ring core 26 molded to the outer-ring main body 25, the outside outer-ring raceway member 31 and inside outer-ring raceway member 32, which are formed separately and for which hardening treatment is performed, are respectively fastened inside the mating concave surfaces 30 of the outer-ring core 26, to assemble the outer ring 2a. With the outer ring 2a assembled, a processing machine such as a grinder is used to perform grinding of the outer-ring raceway 33. In this way, the effect of a change in dimension when press fitting the outside outer-ring raceway member 31 and inside outer-ring raceway member 32 inside the mating concave surfaces 30 of the outer-ring core 26 is eliminated.

Figure 3:
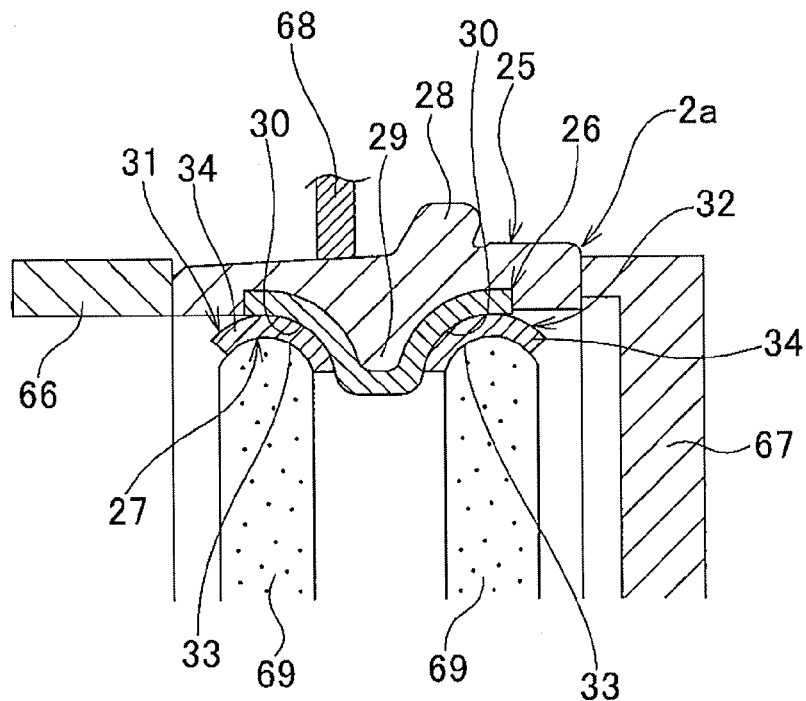
FIG. 3 is a drawing explaining a method for holding the outer ring by the processing machine when performing a grinding process on the outer-ring raceways in the manufacturing process of the wheel-support hub unit in the first example.

In this example, the outer-ring main body 25 is made using a non-magnetic material such as synthetic resin containing reinforced fibers, or an aluminum alloy. As a result, the outer-ring main body 25 cannot be supported by a processing machine such as grinder using a magnet shoe type chuck. Therefore, as illustrated in FIG. 3, the outer ring 2a is pressed against a backing plate 67 of a processing machine that is located on the inside end surface in the axial direction of the outer-ring 2a by a pair of pressure rollers 66 that is located on the outside end surface in the axial direction of the outer ring 2a. Then, with the outer circumferential surface of the outer ring 2a supported by a pair of shoes 68 of the processing machine, grinding of the outer-ring raceway 33 is performed using a grindstone 69. The installation positions of the shoes 68 and grindstone 69 are shifted from each other in the circumferential direction.

Figure 4:
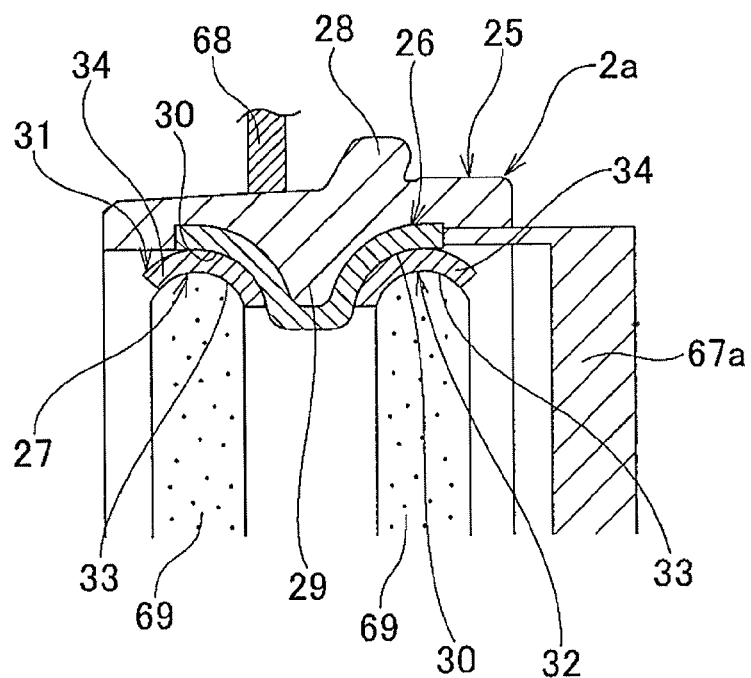
FIG. 4 is a drawing for explaining a method for holding the outer ring by the processing machine that is different than the method illustrated in FIG. 3.

On the other hand, the processing machine can move in the axial direction, and, as illustrated in FIG. 4, when part of the outer-ring core 26 that is made of a ferrous alloy (in the case of this example, the inside end surface in the axial direction of the outer-ring core 26) is exposed from the outer-ring main body 25, grinding of the outer-ring raceway 33 is performed with an electromagnetic backing plate 67a of the processing machine adhered to the exposed portion of the outer-ring core 26, and with the outer circumferential surface of the outer ring 2a being held by the pair of shoes 68 of the processing machine.

After that, the seal ring 55 and rolling-element assembly are assembled with the outer ring 2a to form the outer-ring unit.

Figure 5:
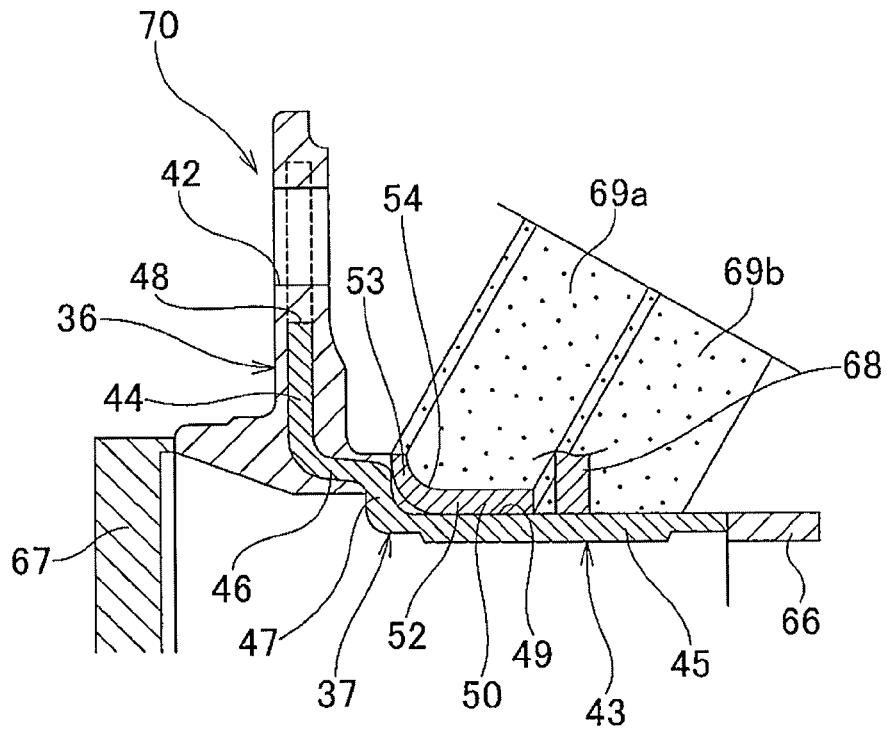
FIG. 5 is a drawing for explaining a method for supporting the hub by a processing machine when performing a grinding process on the inner-ring raceways in the manufacturing process of the wheel-support hub unit in the first example.
Figure 6:
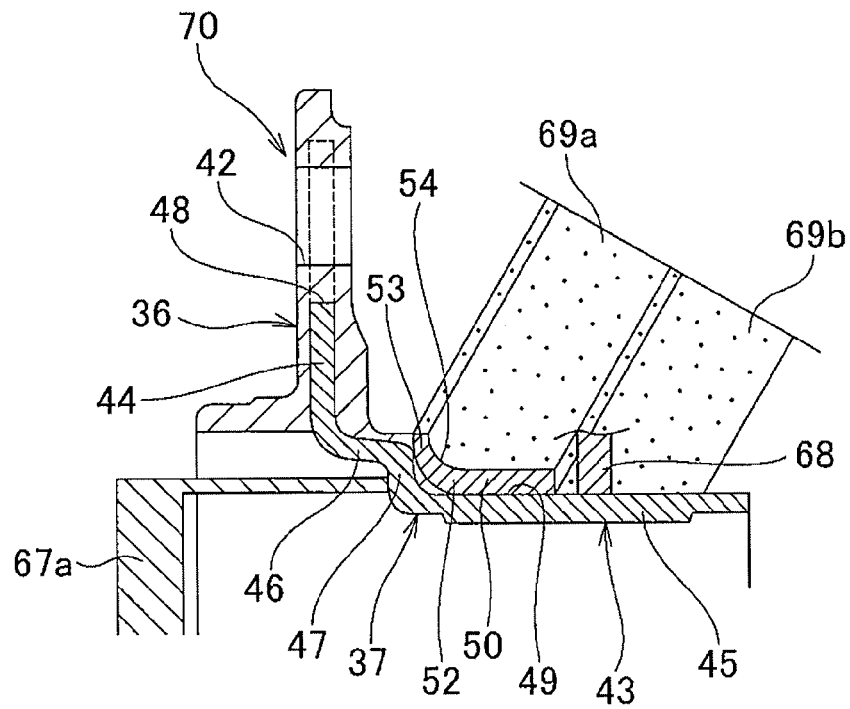
FIG. 6 is a drawing for explaining a method for holding the hub by the processing machine that is different than the method illustrated in FIG. 5.

On the other hand, with the hub core 37 molded to the hub main body 36, the outside inner-ring raceway member 50 that is formed separated and for which hardening processing has been performed is fastened around the outside of the portion of the fitting surface 49 of the hub core 37 near the outside in the axial direction, to form a hub intermediate assembly 70 (see FIG. 5 and FIG. 6). In the state of the hub intermediate assembly 70, a grinder or the like is used to grind the inner-ring raceway 54 of the outside inner-ring raceway member 50, the inside end surface in the axial direction of the outside inner-ring raceway member 50 and the portion of the fitting surface 49 around which the inside inner-ring raceway member 51 is fastened. In this way, an effect due to a change in dimensions is eliminated when press fitting outside inner-ring raceway member 50 and inside inner-ring raceway member 51 into the fitting surface 49.

In this example, the hub main body 36 is made using a non-magnetic material such as synthetic resin containing reinforced fiber, or an aluminum alloy. Consequently, the hub main body 36 cannot be supported by a processing machine such as grinder using a magnetic chuck. Therefore, as illustrated in FIG. 5, the hub intermediate assembly 70 is pressed against a backing plate 67 of the processing machine that is located on the outside end surface in the axial direction of the hub main body 36 of the hub 3a by a pressure roller 66 that is located on the inside end surface in the axial direction of the hub core 37 of the hub intermediate assembly 70. With the outer circumferential surface of the hub core 37 supported by the pair of shoes of the processing machine, grinding of the inner-ring raceway 54 of the outside inner-ring raceway member 50, the inside end surface in the axial direction of the outside inner-ring raceway member 50, and the portion of the fitting surface 49 around which the inside inner-ring raceway member 51 is fastened is performed using grindstones 69a, 69b. The installation position of the shoes 68 and grindstones 69a, 69b are shifted from each other in the circumferential direction.

When the processing machine is capable of moving in the axial direction, and, as illustrated in FIG. 6, when part of the ferrous alloy hub core 37 (in this example, the outside surface of the stepped section 47 of the hub core 37) is exposed from the hub main body 36, grinding of the inner-ring raceway 54, inside surface in the axial direction of the outside inner-ring raceway member 50, and the portion of the fitting surface 49 around which the inside inner-ring raceway member 51 is fastened using the grindstones 69a, 69b is performed with the electromagnetic backing plate 67a of the processing machine adhered to this portion, and with the outer circumferential surface of the hub core 37 supported by the pair of shoes 68 of the processing machine.

By performing processing with the shoes 68 in contact with the outer circumferential surface of the hub core 37, it is possible to suppress the eccentric effect that occurs when the outside inner-ring raceway member 50 is fastened around the outside of the mating surface of the hub core 37. As a result, it is possible to prevent uneven rotation of the hub during use due to eccentricity. Furthermore, in the case of a wheel-support hub unit 1b (see FIG. 7) for a driving wheel in which a spline hole 72 is formed around the circumferential surface of the hub 3b as in a second example of an embodiment of the invention, by performing this kind of processing, it becomes possible to keep the spline hole 72 concentric with the inner-ring raceway 54 of the outside inner-ring raceway 50.

Moreover, by using a processing machine to perform grinding of the inner-ring raceway 54 of the outside inner-ring raceway member 50, the end surface of the outside inner-ring raceway member 50, and the fitting surface 49 of the hub core 37, the effect of changes in dimensions when fastening the outside inner-ring raceway member 50 and inside inner-ring raceway member 51 is eliminated, and precision for applying appropriate preloading to the rolling elements 4 is maintained. Taking into consideration that the synthetic resin containing reinforced fiber or the aluminum alloy is not suitable for grinding, and that alumite treatment is performed on the rotating-side flange, grinding of the hub main unit 36 is not performed.

Next, the outer-ring unit is assembled with the hub intermediate assembly 70 from the inside in the axial direction of the hub intermediate assembly 70. Furthermore, the inside inner-ring raceway 51 is fastened around the fitting surface 49 of the hub core 37 from the inside in the axial direction, and by forming a crimped section 71 by bending a cylindrical section for crimping that is formed around the edge on the inside end in the axial direction of the hub core 37 outward in the radial direction as illustrated in FIG. 1, the inside inner-ring raceway member 51 is fastened to the hub core 37.

With the wheel-support hub unit 1a of this example, together with reducing the weight, it is possible to improve the durability. In other words, the outer-ring main body 25 and the hub main body 36 are made using a synthetic resin containing reinforced fibers, or an aluminum alloy. Therefore, it is possible to reduce the weight of the outer ring 2a and hub 3a.

The outside outer-ring raceway member 31, inside outer-ring raceway member 32, the outside inner-ring raceway member 50 and the inside inner-ring raceway member 51 are made of a ferrous alloy such as various kinds of carbon steel. Therefore, it is possible to maintain the high strength of the outer-ring raceways 33 and inner-ring raceways 54.

The outside outer-ring raceway member 31, inside outer-ring raceway member 32, the outside inner-ring raceway member 50 and the inside inner-ring raceway member 51 are not directly assembled in the outer-ring main body 25 or hub main body 36, but are fastened to the outer-ring core 26 and hub core 37 that are made of the same ferrous alloy material. Therefore, it is possible to make the linear expansion coefficient between these raceway members and the cores nearly the same. As a result, it is possible to prevent a change in preloading of the rolling elements, and gaps that occur in the areas of contact between the outside outer-ring raceway member 31 and inside outer-ring raceway member 32 and the outer-ring core 26, and the areas of contact between the outside inner-ring raceway member 50 and inside inner-ring raceway member 51 and the hub core 37 that are caused by differences in the linear expansion coefficient between these raceway members and cores. Furthermore, the occurrence of galvanic corrosion in the areas of contact between these raceway members and cores is also prevented.

Moreover, the boundary portion between the outer-ring main body 25 and the outer-ring core 26, and the boundary between the hub main body 36 and the hub core 37 are located in spaces that are blocked from the external space by the seal ring 55, inside cap member 62 and outside cap member 64. Therefore, even when gaps caused by differences in linear expansion coefficient occur in the boundary areas, the gaps are prevented from becoming paths for foreign matter to enter.

Furthermore, the hub core flange 44, for which a high-strength ferrous alloy is used, is molded in a position that is aligned with the rotating-side flange 39 of the hub main body 36, for which a synthetic resin containing reinforced fibers or an aluminum alloy that are lighter but have less strength than a ferrous alloy is used. Therefore, together with being able to reduce the weight, it is possible to maintain the rigidity of the rotating-side flange 39.

SECOND EXAMPLE

Figure 7:
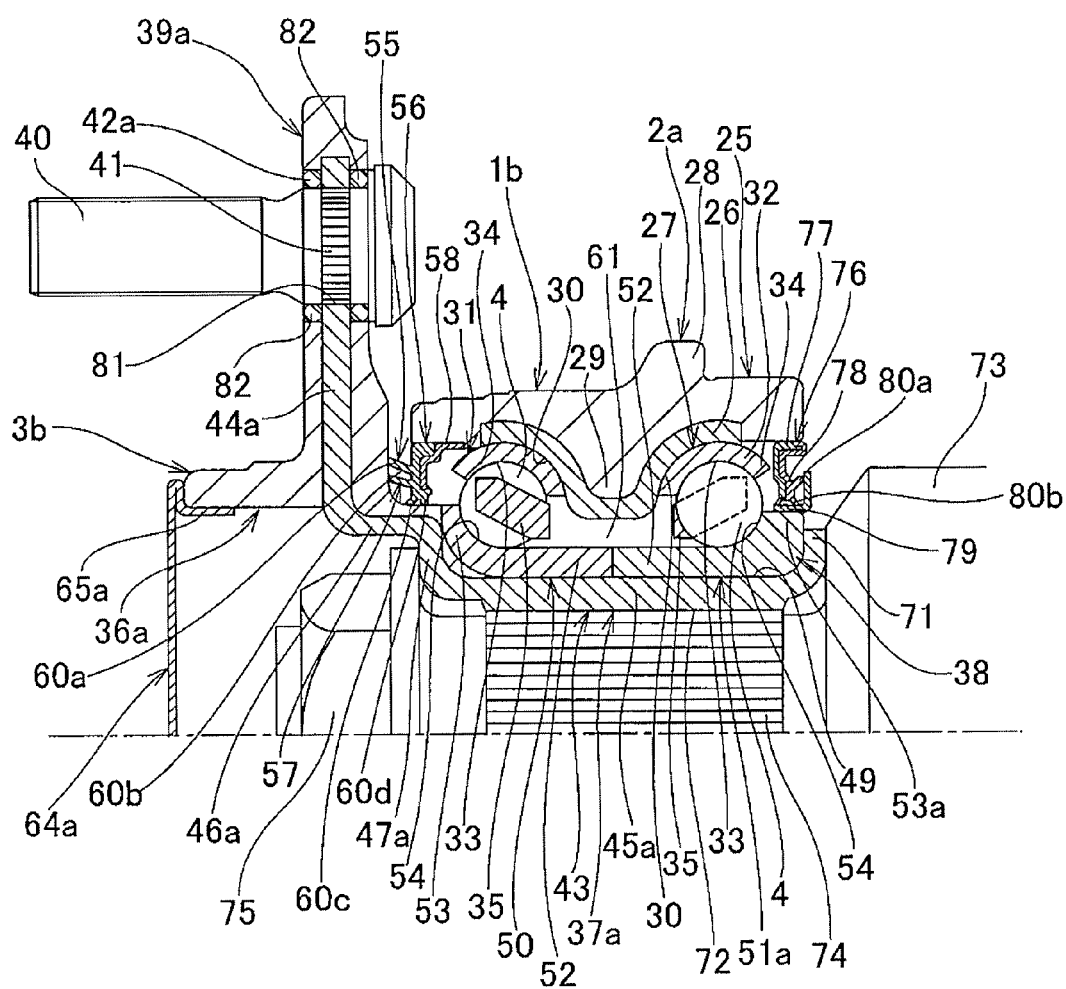
FIG. 7 is a cross-sectional drawing illustrating the construction of a wheel-support hub unit of a second example of an embodiment of the present invention.

FIG. 7 illustrates a second example of an embodiment of the present invention. This example applies the present invention to a wheel-support hub unit for a driving wheel. In the wheel-support hub unit 1b for a driving wheel of this example as well, the hub main body 36a of the hub 3b is made using a synthetic resin containing reinforced fiber or an aluminum alloy. Moreover, a spline hole 72 is formed around the inner circumferential surface of the hub core 37a of the hub 3b.

Together with fitting a spline shaft 74, which is fastened to the center section of the outside end surface in the axial direction of an outer ring 73 of a universal joint that is inserted from the inside in the axial direction of the hub core 37a, into the spline hole 72 with a spline fit, the portion of the outer circumferential edge of the outside end surface in the axial direction of the outer ring 73 of the universal joint is brought into contact with the inside end surface in the axial direction of the hub 3b (crimped section 71). In this state, a nut 75 is screwed onto the tip end section of the spline shaft 74, and by further tightening the nut 75, the hub 3b is fastened and held between the nut 75 and the outer ring 73 of the universal joint. Moreover, the inside surface in the axial direction of the nut 75 comes in contact with the outside surface in the axial direction of the stepped section 47a of the hub core 37a.

In this example, when molding the hub core 37a to the hub main body 36a, the outside surface in the axial direction of the hub core flange 44a is used to prevent the material of the hub main body 36a from flowing to the inner-diameter side of the large-diameter cylindrical section 46a and small-diameter cylindrical section 45a of the hub core 37a. Moreover, the outside cap member 64a is placed on the outside end in the axial direction of the hub main body 36a by fastening the cylindrical section 65a of the outside cap member 64a on the inside of the outside end section in the axial direction of the hub main body 36a. When the hub main body 36a is made using an aluminum alloy, preferably the outside cap member 64a is made using an aluminum alloy or a material for which galvanic corrosion will not occur between the material and an aluminum alloy.

In this example, the thickness in the axial direction of the shoulder section 53a of the inside inner-ring raceway member 51a is greater than the thickness of the shoulder section 53 of the outside inner-ring raceway member 50. A combined seal ring 76 is located between the inner circumferential surface of the inside end in the axial direction of the outer ring main body 25 of the outer ring 2a and the outside end surface in the radial direction of the shoulder section 53a of the inside inner-ring raceway member 51a.

In this example, when the outer-ring main body 25 is made using an aluminum alloy, rubber, a gasket or adhesive is placed between the inner circumferential surface of the outer-ring main body 25 and the ferrous alloy metal insert 77 of the combined seal ring 76. As a result, foreign matter such as water entering in between the outer-ring main body 25 and the metal insert 77, as well as the occurrence of galvanic corrosion in this portion are prevented. Alternatively, it is also possible to prevent the occurrence of galvanic corrosion by employing as the material of the metal insert 77, a material for which galvanic corrosion does not occur between this material and an aluminum alloy of the outer-ring main body 25.

Moreover, when a slinger 79 is exposed to dirty water, of the slinger 79, corrosion occurs on the sliding surfaces thereof with the seal lips 80a, 80b of the seal member 78, and it becomes easy for the seal lips 80a, 80b to wear. In order to prevent this kind of corrosion, preferably the slinger 79 is made of an austenite type stainless steel, for which passivation treatment is performed, such as SUS 304.

In this example, through holes 42a that pass in the axial direction through a plurality of locations in the circumferential direction of the rotating-side flange 39a of the hub main body 36a are formed for fastening to a plurality of studs 40. Moreover, with the hub core 37a molded to the hub main body 36a, serration holes 81 that are capable of a direct serration fit with serration sections 41 of the studs 40 are formed in the hub core flange 44a of the hub core 37a at positions that match with the through holes 42a.

Furthermore, a pair of O-rings 82 is respectively located between the outer circumferential surface of each of the studs 4 and portions of the inner circumferential surface of each of the through holes 42a located on both sides in the axial direction of the serration holes 81. As a result, the boundary between the hub main body 36a and the hub core 44a is blocked from the external space.

In this example, the serration holes 81 in the ferrous alloy hub core flange 44a and the serration sections 41 of the studs 40 direct fit together with a serration fit. Therefore, it is possible to stably fasten the studs 40. The other construction and functions of this second example are the same as in the first example of an embodiment.

THIRD EXAMPLE

Figure 8:
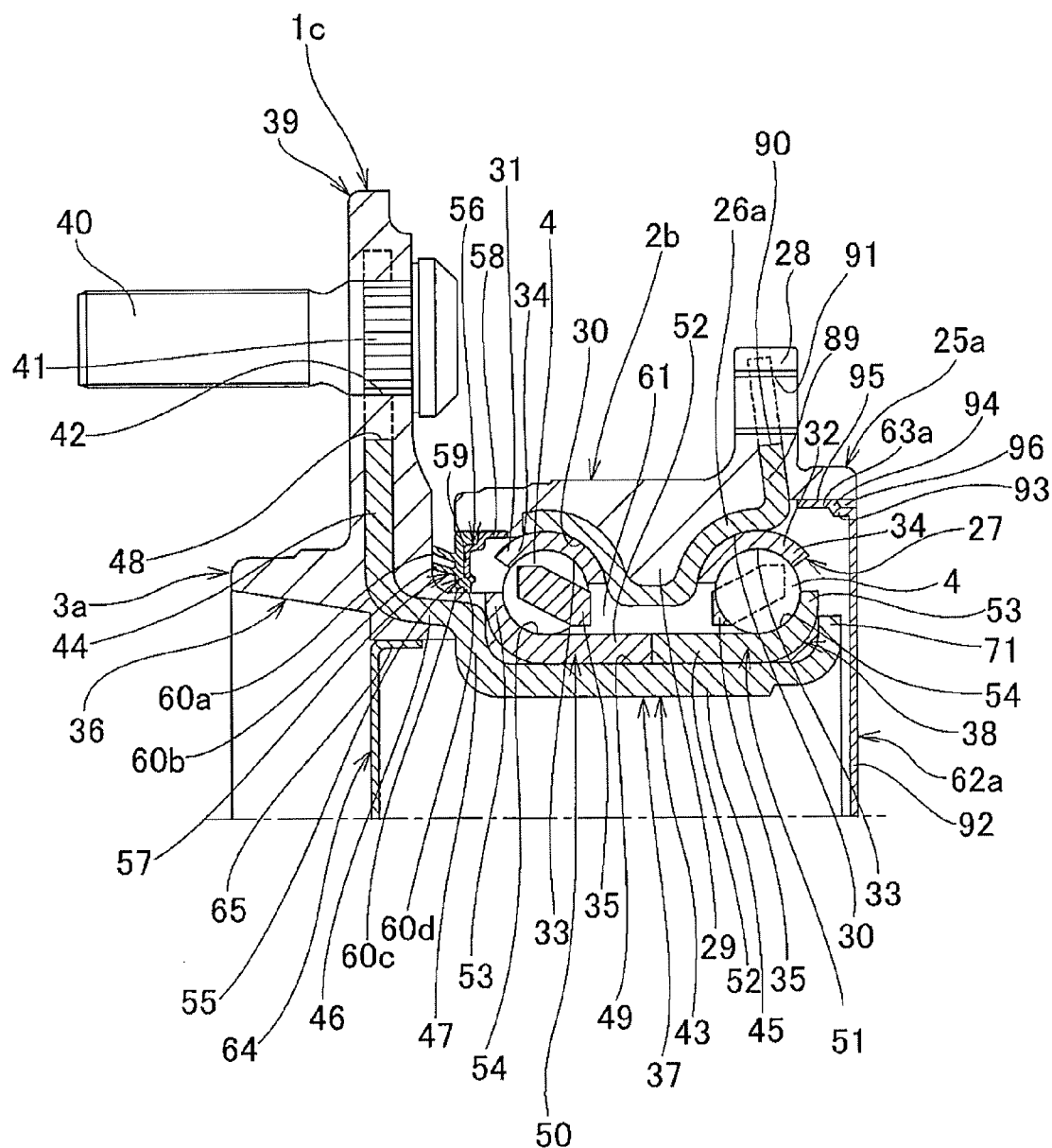
FIG. 8 is a cross-sectional drawing illustrating the construction of a wheel-support hub unit of a third example of an embodiment of the present invention.

FIG. 8 illustrates a third example of an embodiment of the present invention. This example is similar to the first example of an embodiment in that the present invention is applied to a wheel-support hub unit for a undriven wheel. In the wheel-support hub unit 1c of this example, the construction of the outer-ring core 26a of the outer ring 2b differs from that in the first example of an embodiment. The other construction of the outer ring 2b is the same as that of the outer ring 2a of the first example of an embodiment.

In this example, through holes 91 that pass in the axial direction through a plurality of location in the circumferential direction around the stationary-side flange 28 of the outer-ring main body 25a of the outer ring 2b are formed for fastening a plurality of bolts. The outer-ring core 26a is made using a ferrous alloy such as various kinds of carbon steel, and has not undergone hardening treatment such as heat treatment. The basic construction of the outer-ring core 26a is the same as that of the outer-ring core 26 of the first example of an embodiment. An outer-ring core flange 89 is formed by bending the portion that extends further from the inside end in the axial direction of the outer-ring core 26a outward in the radial direction. A notch is formed in the outer-ring core flange 89 extending from the outside end to the middle section in the radial direction. With the middle section in the axial direction of the outer-ring core 26a aligned with the inward facing projection 29 of the outer-ring main body 25, and with the outer-ring core flange 89 aligned with the stationary-side flange 28 of the outer-ring main body 25a, the outer-ring core 26a is molded to the outer-ring main body 25a.

With the outer-ring core 26a molded to the outer-ring main body 25a, the inside surfaces of the notches 90 in the outer-ring core flange 89 are not exposed to the inner circumferential surfaces of the through holes 91 that are formed at a plurality of locations in the circumferential direction around the stationary-side flange 28 for inserting the bolts. In this way, interference between the outer-ring core flange 89 and the bolts that are inserted through the through holes 91 is prevented. Instead of notches 90, it is possible to form outer-ring core side through holes 91 (not illustrated in the figure), which have an inner diameter that is greater than the inner diameter of the through holes 91, at positions in the outer-ring core flange 89 that are aligned with the through holes 91 in the stationary-side flange 28. In either case, even in the case where the material of the outer-ring core flange 89 and the material of the bolts are in a relationship such that galvanic corrosion occurs, the outer-ring core flange 89 and bolts are prevented from coming in contact.

In this example, the shape of the inside cap member 62a that is provided on the inside end in the axial direction of the outer-ring main body 25a is different than that of the inside cap 62 of the first example of an embodiment. The inside cap member 62a is comprised of a bottom section 92 and a cylindrical section 63a. The cylindrical section 63a has a small-diameter cylindrical section 93, which is formed by bending the edge on the outside end in the radial direction of the bottom section toward the outside in the axial direction (left side in FIG. 1), and a large-diameter cylindrical section 95, which is continuous with the outside in the axial direction of the small-diameter cylindrical section 93 by way of a stepped section 94. The large-diameter cylindrical section 95 is fastened inside the inside end section in the axial direction of the inner circumferential surface of the outer-ring main body 25a.

A ring-shaped seal member 96, such as packing, is provided in a gap that exists between the inner circumferential surface of the outer-ring main body 25a and the small-diameter cylindrical section 93 of the inside cap member 62a. In this way, galvanic corrosion of the mating surfaces of the outer-ring main body 25a and the inside cap member 62a is prevented. When the outer-ring main body 25a is made using an aluminum alloy, the inside cap member 62a is made using an aluminum alloy or a material for which galvanic corrosion does not occur with an aluminum alloy.

In the case of the wheel-support hub unit 1c of this example, an outer-ring core flange 89, which is made of using a high-strength ferrous alloy, is molded to the stationary-side flange 28, which is made of a synthetic resin containing reinforced fibers, or an aluminum alloy that is lightweight, but that has lower strength than a ferrous alloy. Therefore, by firmly fastening the wheel-support hub unit 1c to the suspension, it is possible to reduce the weight, as well as maintain the rigidity of the stationary-side flange 28. The other construction and functions of this third example are the same as in the first example of an embodiment.

FOURTH EXAMPLE

Figure 9:
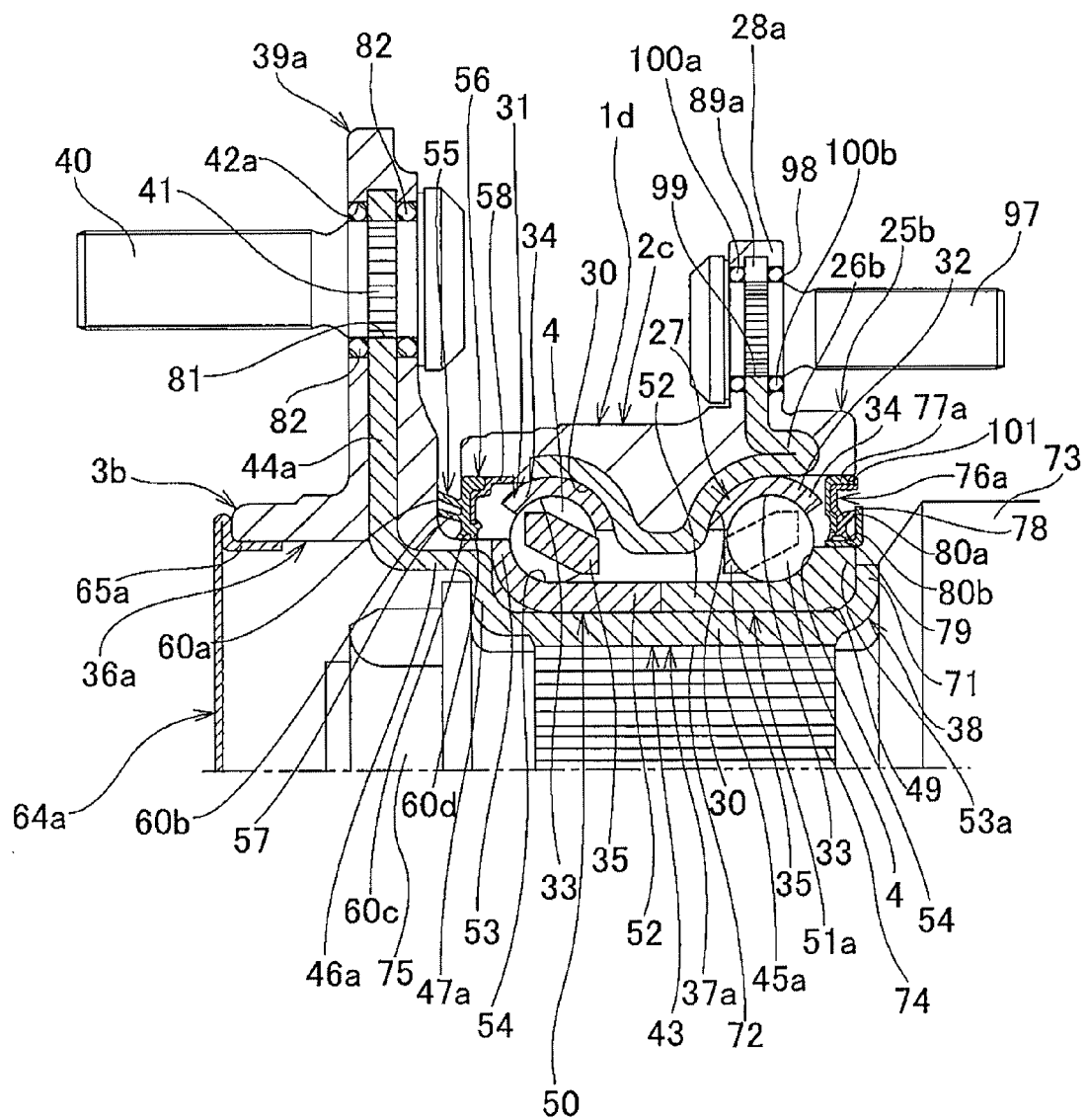
FIG. 9 is a cross-sectional drawing illustrating the construction of a wheel-support hub unit of a fourth example of an embodiment of the present invention.

FIG. 9 illustrates a fourth example of an embodiment of the present invention. In this example, as in the second example of an embodiment, the present invention is applied to a wheel-support hub unit for a driving wheel. In the case of the wheel-support hub unit 1d of this example, the construction of the outer-ring main body 25b and the outer-ring core 26b of the outer ring 2c is different than that of the second example of an embodiment. The other construction of the outer ring 2c is the same as the outer ring 2a of the second example of an embodiment.

In this example, through holes 98 that pass in the axial direction at a plurality of locations in the circumferential direction of the stationary-side flange 28a of the outer-ring main body 25b of the outer ring 2c are formed for a plurality of studs 97 to pass through. Moreover, the outer-ring core 26b of this example, is made using a ferrous alloy such as various kinds of carbon steel, and has not undergone a hardening treatment such as heat treatment. In addition to the same construction as the outer-ring core 26 of the second example of an embodiment, the outer-ring core 26b is provided with an outer-ring core flange 89a that is formed by bending the inside end in the axial direction of the outer-ring core 26 toward the outside in the axial direction (left side in FIG. 9), and further bending it outward in the radial direction. The outer-ring core flange 89a is provided with serration holes 99 that are capable of a direct serration fit with the serration sections of the studs 97 and formed at positions that are aligned with the through holes 98 of the outer-ring main body 25b with the outer-ring core 26b molded to the outer-ring main body 25b.

Furthermore, a pair of O-rings 100a, 100b are located between the outer circumferential surface of the studs 97 and portions of the inner circumferential surface of the through holes 98 between which the serration holes 99 are sandwiched in the axial direction. In this way, the boundary between the outer-ring main body 25b and outer-ring core 26b is blocked from the external space. The serration holes 99 of the ferrous alloy outer-ring flange 89a and the serration sections of the studs 97 fit together directly with a serration fit in this way, so the studs 97 can be fastened stably.

In this example, as in the second example of an embodiment, a combined seal ring 76a is provided between the inner circumferential surface of the inside end in the axial direction of the outer-ring main body 25b of the outer ring 2b and the outside end surface in the radial direction of the shoulder section 53a of the inside inner-ring raceway member 51a. Moreover, a ring-shaped nose gasket 101 is provided between the outer circumferential surface of the inside end in the axial direction of the metal insert 77a of the seal ring 76a and the inner circumferential surface of the inside end in the axial direction of the outer-ring main body 25a. By employing construction such as this, foreign matter such as water is prevented from entering in between the outer-ring main body 25a and the metal insert 77a, and galvanic corrosion is prevented in this portion. Furthermore, by making the material of the metal insert 77a a material for which galvanic corrosion does not occur between the material and an aluminum alloy of the outer-ring main body 25a, it is also possible to prevent the occurrence of galvanic corrosion. The other construction and functions of this fourth example are the same as in the second example of an embodiment.

FIFTH EXAMPLE

Figure 10:
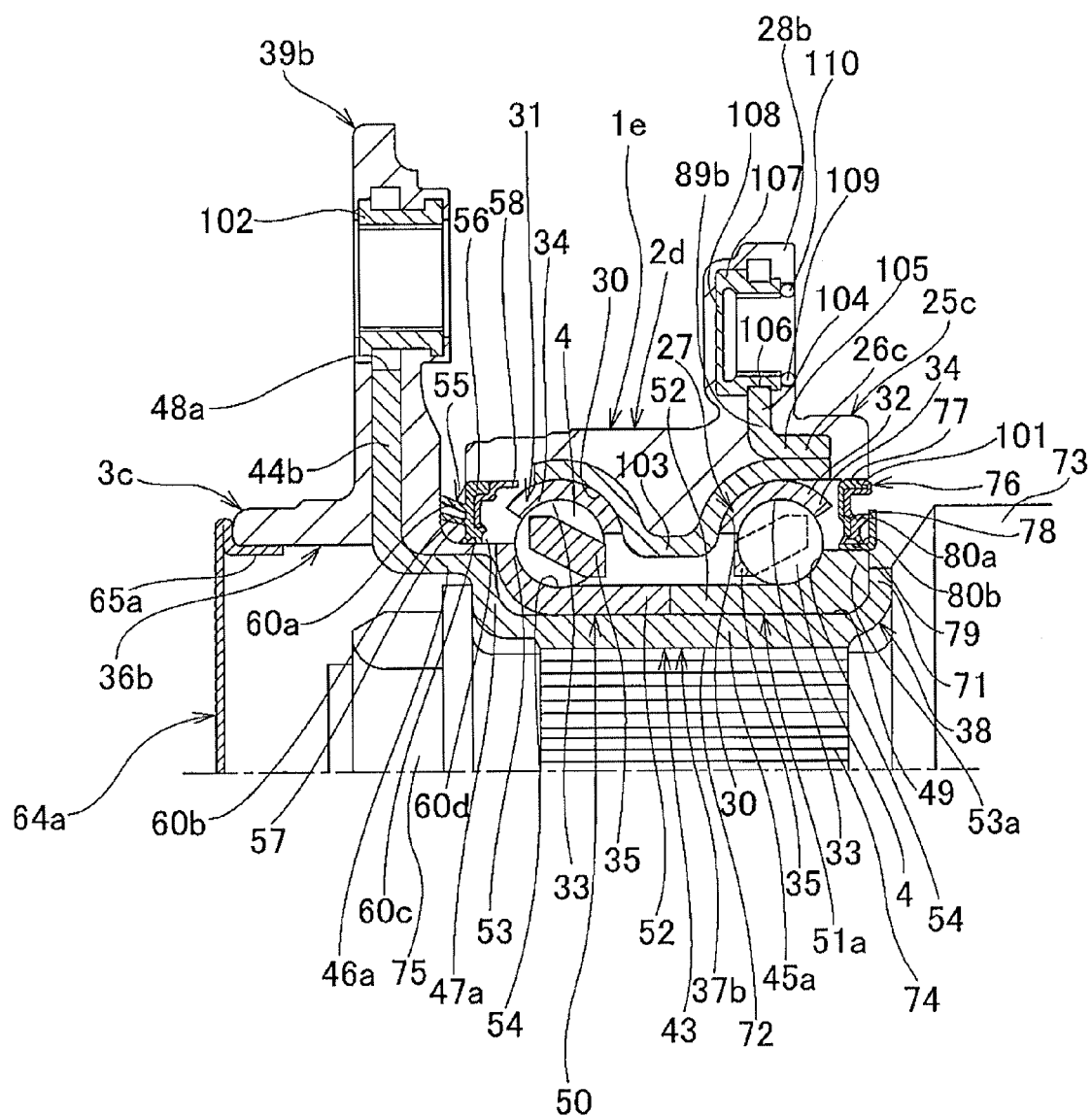
FIG. 10 is a cross-sectional drawing illustrating the construction of a wheel-support hub unit of a fifth example of an embodiment of the present invention.

FIG. 10 illustrates a fifth example of an embodiment of the present invention. In the case of the wheel-support hub unit for a driving wheel of this example, cylindrical nuts 102 for fastening a plurality of bolts (not illustrated in the figure) for attaching a wheel are molded at a plurality of locations in the circumferential direction of the rotating-side flange 39b of the hub main body 36b of the hub 3c. The nuts 102 are molded with the opening sections on both ends in the axial direction open on both end surfaces in the axial direction of the rotating-side flange 39b, and with the outside surface in the axial direction of the rotating-side flange 39b (left side surface in FIG. 10) flattened. In other words, when the thickness in the axial direction of the nuts 102 greater than the thickness in the axial direction of the rotating-side flange 39b, the nuts 102 are molded with the outside end in the axial direction of nuts 102 not protruding any further to the outside in the axial direction than the other portions of the rotating-side flange 39b and with the inside end in the axial direction of the nuts 102 protruding further to the inside in the axial direction than the other portions of the rotating-side flange 39b.

The hub core 37b has nearly the same construction as the hub core 37 of the first example of an embodiment, and notches 48a that extend from the outside end to the middle section in the radial direction are formed in the hub core flange 44b of the hub core 37b at positions that are aligned with the nuts 102 when molded in the hub main body 36b. In this way, with the hub core 37b molded in the hub main body 36b, interference is prevented between the hub core flange 44b and the nuts 102. When the hub main body 36b is made using an aluminum alloy, the nuts 102 are preferably made using a material such as stainless steel, brass or the like for which galvanic corrosion does not occur with the hub main body 36b, and does not cause the hub main body 36b to deteriorate.

In this example, the outer-ring core 26c of the outer ring 2d is comprised of an outer-ring core base member 103 having the same construction as that of the outer-ring core 26 of the second example of an embodiment, and a separate outer-ring core flange member 104. The outer-ring core flange member 104 has a cylindrical section 105 and an outer-ring core flange 89b that is bent outward in the radial direction from the outside end in the axial direction of the cylindrical section 105. When molded in the outer-ring main body 25b, notches 106 that extend from the outside end to the middle section in the radial direction are formed in the outer-ring core flange 89b at positions that are aligned with the nuts 107. The outer-ring core flange member 104 is fastened to the inside end in the axial direction of the outer circumferential surface of the outer-ring core base member 103 by welding the inner circumferential surface of the cylindrical section 105 of the outer-ring core flange member 104. With construction such as this, it is possible to perform adjustment of the position in the axial direction of the outer-ring core flange 89b by adjusting the position where the outer-ring core flange member 104 is welded to the outer-ring core base member 103.

Nuts 107 for fastening bolts (not illustrated in the figure) for attaching to a suspension are molded into a plurality of locations in the circumferential direction of the stationary-side flange 28b of the outer-ring main body 25c of the outer ring 2d. The nuts 107 have a cylindrical shape with a bottom 108 on the outside end in the axial direction, and are open only on the inside in the axial direction. These kinds of nuts 107 are molded to the outer-ring main body 25c with part of the outer circumferential surface thereof fitted in the notches 106 in the outer-ring core flange 89b of the outer-ring core 26b, and with the opening section on the inside in the axial direction open to the inside surface in the axial direction of the stationary-side flange 28b. Moreover, an O-ring 110 is provided on the inside in the axial direction of the inside end surface in the axial direction of each of the nuts 107 and around each of the inner circumferential surface of the opening sections 109 that are formed at positions on the stationary-side flange 28b that are aligned with the opening sections on the inside in the axial direction of the nuts 107. In this way, the boundary between the nuts 107 and the outer-ring main body 25c and the boundary between the outer-ring core 26c and the outer-ring main body 25 are blocked from the external space, and moisture and the like is prevent from entering in. When the outer-ring main body 25c is made using an aluminum alloy, the nuts 107 are preferably made using a material such as stainless steel, brass or the like for which galvanic corrosion does not occur with the outer-ring main body 25c, and does not cause the hub main body 36b to deteriorate.

In this example, the nuts 102 are molded to the hub main body 36b with the nuts 102 being in a state of not fitting with the hub core flange 44b, however, the nuts 102 can also be molded being in a state of fitting with the notches 48a in the hub core 44. On the other hand, the nuts 107 are molded to the outer-ring main body 25b in a state of being fitted with the notches 106 in the outer-ring core flange 89b in this example, however, the nuts 107 can also be molded in a state of not being fitted in the notches 106 in the outer-ring core flange 89b.

The construction of each of the examples of embodiments described above, can be combined as long as there is no conflict.

INDUSTRIAL APPLICABILITY

The present invention can be suitably applied mainly to a wheel-support hub unit for an automobile, however, is not limited to this, and for other uses as well, can be widely applied to a rolling bearing unit that has a stationary bearing ring that is connected to the non-rotating support member, a rotating bearing ring that supports a rotating member, and a plurality of rolling elements that are arranged between the raceway surfaces of the rotating bearing ring and the raceway surfaces of the stationary bearing ring, and that supports a rotating member by way of a non-rotating member so as to rotate freely. Moreover, the present invention was explained with reference to embodiments of an inner-ring rotating type rolling bearing unit, however, the present invention can also be applied to an outer-ring rotating type rolling bearing unit.

EXPLANATION OF THE REFERENCE NUMBERS 1, 1a, 1b, 1c, 1d, 1e Wheel-support hub unit
2, 2a, 2b, 2c, 2d Outer ring
3, 3a, 3b, 3c Hub
4 Rolling element
5 Outer-ring main body
6 Outer-ring raceway member
7 Stationary-side flange
8 Outer-ring raceway
9 Hub main body
10 Outside inner-ring raceway member
11 Inside inner-ring raceway member
12 Rotating-side flange
13 Outside inner-ring raceway
14 Inside inner-ring raceway
15 Shoulder section
16 Nut
17 Retainer
18 Rolling-element installation space
19 Seal ring
20 Cylindrical member
21 Cover
24 Boundary
25, 25a, 25b Outer-ring main body
26, 26a, 26b, 26c Outer-ring core
27 Outer-ring raceway member
28, 28a, 28b Stationary-side flange
29 Inward facing projection
30 Mating concave surface
31 Outside outer-ring raceway member
32 Inside outer-ring raceway member
33 Outer-ring raceway
34 Counter bore
35 Retainer
36, 36a, 36b Hub main body
37, 37a, 37b Hub core
38 Inner-ring raceway member
39, 39a, 39b Rotating-side flange
40 Stud
41 Serration section
42, 42a Through hole
43 Cylindrical section
44, 44a, 44b Hub core flange
45, 45a Small-diameter cylindrical section
46, 46a Large-diameter cylindrical section
47, 47a Stepped section
48, 48a Notch
49 Fitting surface
50 Outside inner-ring raceway member
51, 51a Inside inner-ring raceway member
52 Cylindrical section
53, 53a Shoulder section
54 Inner-ring raceway
55 Seal ring
56 Metal insert
57 Seal member
58 Cylindrical fitting section
59 Circular ring section
60a, 60b, 60c, 60d Seal lip
61 Rolling-element installation space
62, 62a Inside cap member
63, 63a Cylindrical section
64, 64a Outside cap member
65, 65a Cylindrical section
66 Pressure roller
67, 67a Backing plate
68 Shoe
69, 69a, 69b Grindstone
70 Intermediate assembly
71 Crimped section
72 Spline hole
73 Outer ring of a universal joint
74 Spline shaft
75 Nut
76, 76a Combined seal ring
77, 77a Metal insert
78 Seal member
79 Slinger
80a, 80b Seal lip
81 Serration hole
82 O-ring
83 Sliding ring
84 Cylindrical section
85 Flange section
86 Bearing surface
87 Fastening groove
88 O-ring
89, 89a, 89b Outer-ring core flange
90 Notch
91 Through hole 92 Bottom section
93 Small-diameter cylindrical section
94 Stepped section
95 Large-diameter cylindrical section
96 Seal member
97 Stud
98 Through hole
99 Serration hole
100a, 100b O-ring
101 Nose gasket
102 Nut
103 Outer-ring core base member
104 Outer-ring core flange member
105 Cylindrical section
106 Notch
107 Nut
108 Bottom section
109 Opening section
110 O-ring

What is claimed is:

1. A rolling bearing unit, comprising:
a stationary bearing ring that is supported by and fastened to a support member that does not rotate during use;
a rotating bearing ring that is concentrically arranged with the stationary bearing ring;
stationary-side raceway surfaces and rotating-side raceway surfaces that are formed around circumferential surfaces of the stationary bearing ring and rotating bearing ring that face each other;
a plurality of rolling elements that are located between the stationary-side raceway surfaces and rotating-side raceway surfaces so as to be able to roll freely; and
a seal member that blocks the rolling-element installation space where the rolling elements are located from the external space;
the rotating bearing ring comprising:
a rotating-side main body that has a cylindrical shape and that is made using a synthetic resin containing reinforced fibers, or an aluminum alloy;
a rotating-side core that has a cylindrical shape and that is made using a ferrous alloy, part thereof being molded to the rotating-side main body, and a portion on the stationary bearing ring side of the circumferential surface thereof being exposed from the rotating-side main body; and
a rotating-side raceway member that has a cylindrical shape and that is made using a ferrous alloy, having rotating-side raceway surfaces formed around the circumferential surface on the stationary bearing ring side thereof, and that is fitted with and fastened to the portion on the stationary bearing ring side of the circumferential surface of the rotating-side core that is exposed from the rotating-side main body; and
the stationary bearing ring comprising:
a stationary-side main body that has a cylindrical shape and that is made using a synthetic resin containing reinforced fibers, or an aluminum alloy;
a stationary-side core that has a cylindrical shape and that is made using a ferrous alloy, part thereof being molded to the stationary-side main body, and a portion on the rotating bearing ring side of the circumferential surface thereof being exposed from the stationary-side main body; and
a stationary-side raceway member that has a cylindrical shape and that is made using a ferrous alloy, having stationary-side raceway surfaces formed around the circumferential surface on the rotating bearing ring side thereof, and that is fitted with and fastened to the portion on the rotating bearing ring side of the circumferential surface of the stationary-side core that is exposed from the stationary-side main body.

2. The rolling bearing unit according to claim 1, wherein the boundary section between the rotating-side main body and the rotating-side core, and the boundary section between the stationary-side main body and the stationary-side core are located inside a space that is blocked from the external space by the seal member.

3. The rolling bearing unit according to claim 1, wherein the non-rotating support member is a suspension, and the rolling bearing unit is a wheel-support hub unit for supporting a wheel with respect to this suspension so as to be able to rotate freely;
the stationary bearing ring is an outer ring that is supported by and fastened to the suspension during use;
the rotating bearing ring is a hub that rotates with the wheel while supporting this wheel during use;
the stationary-side raceway surfaces are double-row outer-ring raceway surfaces that are formed around the inner circumferential surface of the outer ring;
the rotating-side raceway surfaces are double-row inner-ring raceway surfaces that are formed around the outer circumferential surface of the hub;
a rotating-side flange that protrudes outward in the radial direction and is for supporting the wheel is formed around a portion of the outer circumferential surface of the rotating-side cylindrical section of the rotating-side main body that protrudes further outward in the axial direction than the outside end section in the axial direction of the outer ring;
a rotating-side core flange that protrudes outward in the radial direction is formed around the outside end in the axial direction of the rotating-side core; and
this rotating-side core flange is molded to the rotating-side flange.

4. The rolling bearing unit according to claim 3, wherein through holes that pass in the axial direction through a plurality of locations in the circumferential direction of the rotating-side flange are formed for fastening a plurality of studs that have a serration section formed around part in the axial direction thereof;
serration holes that pass in the axial direction through a plurality of locations in the circumferential direction of the rotating-side core flange are formed at positions that are aligned with the through holes;
the inner circumferential surfaces of the serration holes are exposed from the inner circumferential surface of the through holes; and
with the serration sections of the studs directly fitted with the serration holes, a pair of seal rings are placed between the outer circumferential surfaces of the studs and portions of the inner circumferential surfaces of the through holes between which the serration holes are sandwiched in the axial direction.

5. The rolling bearing unit according to claim 3, wherein nuts for fastening a plurality of bolts are molded in a plurality of locations in the circumferential direction of the rotating-side flange.

6. The rolling bearing unit according to claim 1, wherein the rolling bearing unit is a wheel-support hub unit for supporting a wheel with respect to a suspension, which is non-rotating support member, so as to be able to rotate freely;
the stationary bearing ring is an outer ring that is supported by and fastened to the suspension during use;

the rotating bearing ring is a hub that rotates with the wheel when the wheel is supported during use;

the stationary-side raceway surfaces are double-row outer-ring raceway surfaces that are formed around the inner circumferential surface of the outer ring;

the rotating-side raceway surfaces are double-row inner-ring raceway surfaces that are formed around the outer circumferential surface of the hub;

a stationary-side flange that protrudes outward in the radial direction and that is supported by the suspension is formed around the outer circumferential surface of the stationary-side cylindrical section of the stationary-side main body;

a stationary-side core flange that protrudes outward in the radial direction is formed around the outer circumferential surface of the stationary-side core; and this stationary-side core flange is molded to the stationary-side flange.

7. The rolling bearing unit according to claim 6, wherein through holes that pass in the axial direction through a plurality of locations in the circumferential direction of the stationary-side flange are formed for fastening a plurality of studs or bolts having serration sections formed around a part in the axial direction thereof;

serration holes that pass in the axial direction through a plurality of locations in the circumferential direction of the stationary-side core flange are formed at positions that are aligned with the through holes;

the inner circumferential surfaces of the serration holes are exposed from the inner circumferential surfaces of the through holes; and with the serration sections of the studs directly fitted with the serration holes, a pair of seal rings are placed between the outer circumferential surfaces of the studs or bolts and portions of the inner circumferential surfaces of the through holes between which the serration holes are sandwiched in the axial direction.

8. The rolling bearing unit according to claim 6, wherein nuts for fastening a plurality of bolts are molded in a plurality of locations in the circumferential direction of the stationary-side flange.

* * * * *